United States Patent
Grace et al.

(10) Patent No.: US 11,351,879 B2
(45) Date of Patent: Jun. 7, 2022

(54) DEPOT CHARGING OF AN ELECTRIC VEHICLE FLEET

(71) Applicant: Proterra Operating Company, Inc., Burlingame, CA (US)

(72) Inventors: Dustin Grace, San Carlos, CA (US); Rajiv Singhal, Pleasanton, CA (US); Andre Lalljie, Los Gatos, CA (US); Brian Pevear, San Mateo, CA (US); Thomas Blazak, Union City, CA (US); Seamus McGrath, Simpsonville, SC (US); John Gerber, Greer, SC (US); Roger Innes, Asheville, NC (US)

(73) Assignee: Proterra Operating Company, Inc., Burlingame, CA (US)

( * ) Notice: Subject to any disclaimer, the term of this patent is extended or adjusted under 35 U.S.C. 154(b) by 67 days.

(21) Appl. No.: 16/753,647

(22) PCT Filed: Oct. 5, 2018

(86) PCT No.: PCT/US2018/054649
§ 371 (c)(1),
(2) Date: Apr. 3, 2020

(87) PCT Pub. No.: WO2019/071154
PCT Pub. Date: Apr. 11, 2019

(65) Prior Publication Data
US 2020/0238844 A1    Jul. 30, 2020

Related U.S. Application Data

(60) Provisional application No. 62/569,311, filed on Oct. 6, 2017.

(51) Int. Cl.
*B60L 53/30* (2019.01)
*B60L 53/67* (2019.01)
(Continued)

(52) U.S. Cl.
CPC .............. *B60L 53/30* (2019.02); *B60L 53/16* (2019.02); *B60L 53/18* (2019.02); *B60L 53/67* (2019.02);
(Continued)

(58) Field of Classification Search
CPC .......... B60L 53/30; B60L 53/67; B60L 53/16; B60L 53/18; B60L 2200/18;
(Continued)

(56) References Cited

U.S. PATENT DOCUMENTS 9,352,658 B2    5/2016  Morris
2010/0045237 A1*  2/2010  Liu ......................... H02J 7/007
                                                                320/128
(Continued)

FOREIGN PATENT DOCUMENTS

EP    2815913 A1 * 12/2014  .............. B60L 53/53
EP    2869445 A1 *  5/2015  ............ H02M 7/162
(Continued)

OTHER PUBLICATIONS

International Search Report and Written Opinion issued in International Application No. PCT/US18/54649, dated Jan. 4, 2019 (11 pages).

*Primary Examiner* — Suresh Memula
(74) *Attorney, Agent, or Firm* — Bookoff McAndrews, PLLC

(57) ABSTRACT

Vehicle depots or yards adapted to charge multiple electric vehicles include multiple charging electrodes to simultaneously direct power to multiple electric vehicles. The charging electrodes may direct power to the electric vehicles from an utility grid or from a secondary power source.

30 Claims, 11 Drawing Sheets

(51) Int. Cl.
*B60L 53/16* (2019.01)
*B60L 53/18* (2019.01)
*H02J 7/00* (2006.01)
*B60K 6/28* (2007.10)

(52) U.S. Cl.
CPC .............. *H02J 7/0013* (2013.01); *B60K 6/28* (2013.01); *B60L 2200/18* (2013.01); *B60L 2210/30* (2013.01); *B60Y 2200/91* (2013.01); *B60Y 2200/92* (2013.01); *B60Y 2300/91* (2013.01); *H02J 2207/20* (2020.01)

(58) Field of Classification Search
CPC . B60L 2210/30; H02J 7/0013; H02J 2207/20; B60K 6/28; B60Y 2200/91; B60Y 2200/92; B60Y 2300/91
USPC .......................................................... 320/109
See application file for complete search history.

(56) References Cited

U.S. PATENT DOCUMENTS

| | | | | |
|---|---|---|---|---|
| 2010/0072946 | A1* | 3/2010 | Sugano | B60L 53/51 320/108 |
| 2012/0013298 | A1* | 1/2012 | Prosser | B60L 53/65 320/109 |
| 2012/0074901 | A1* | 3/2012 | Mohammed | B60L 58/15 320/109 |
| 2012/0081071 | A1* | 4/2012 | Asakura | H02J 7/0068 320/109 |
| 2012/0280656 | A1 | 11/2012 | Bedell | |
| 2013/0030581 | A1* | 1/2013 | Luke | B60L 58/10 700/286 |
| 2013/0193918 | A1 | 8/2013 | Sarkar | |
| 2013/0257146 | A1* | 10/2013 | Nojima | B60L 53/305 307/9.1 |
| 2014/0110205 | A1 | 4/2014 | Dronnik | |
| 2014/0176079 | A1* | 6/2014 | Ito | B60L 3/0046 320/134 |
| 2016/0114683 | A1 | 4/2016 | Bruce | |
| 2016/0268917 | A1* | 9/2016 | Ramsay | H02M 1/14 |
| 2017/0182898 | A1* | 6/2017 | McGrath | B60L 53/16 |
| 2017/0305283 | A1* | 10/2017 | Huh | B60L 53/22 |
| 2019/0389314 | A1* | 12/2019 | Zhu | B60L 53/11 |
| 2020/0070672 | A1* | 3/2020 | Vahedi | H02J 7/045 |
| 2020/0139835 | A1* | 5/2020 | Miler | B60L 53/62 |
| 2020/0171964 | A1* | 6/2020 | McGrath | B60L 53/62 |

FOREIGN PATENT DOCUMENTS

| | | | | |
|---|---|---|---|---|
| EP | 2887527 A1 * | 6/2015 | | B60L 53/53 |
| EP | 3064393 A1 | 9/2016 | | |
| EP | 3678278 A1 * | 7/2020 | | B60L 53/30 |
| EP | 3761255 A1 * | 1/2021 | | G07F 15/008 |
| EP | 3782849 A2 * | 2/2021 | | H02M 7/797 |
| WO | WO-0197360 A2 * | 12/2001 | | H02J 7/0027 |
| WO | WO-2014184729 A2 * | 11/2014 | | B60L 53/53 |
| WO | WO-2019193195 A1 * | 10/2019 | | H02J 7/34 |
| WO | WO-2019201688 A1 * | 10/2019 | | B60L 53/31 |

* cited by examiner

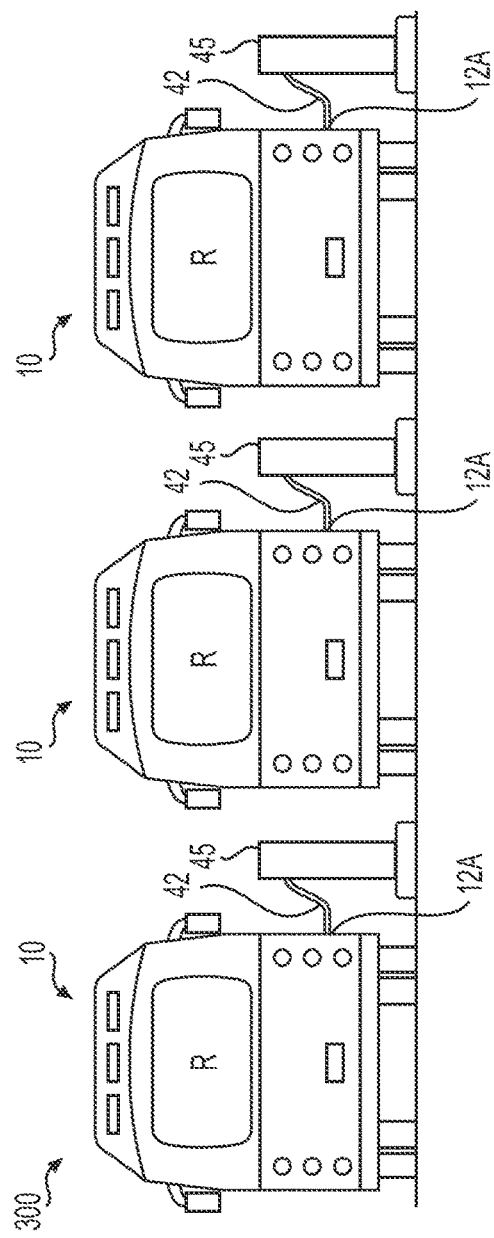
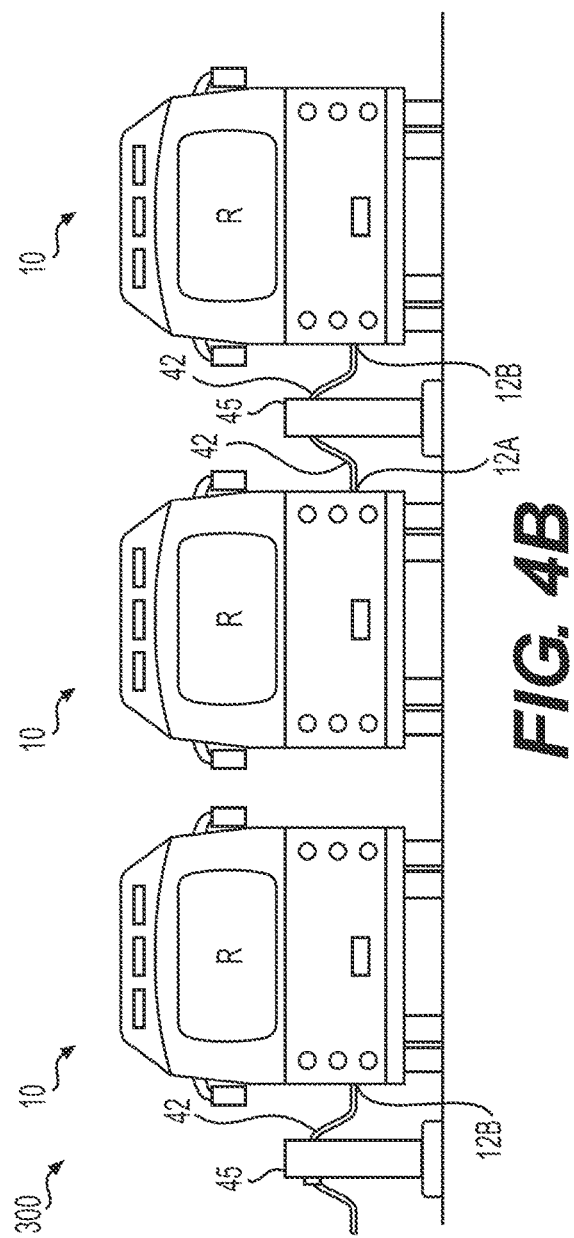

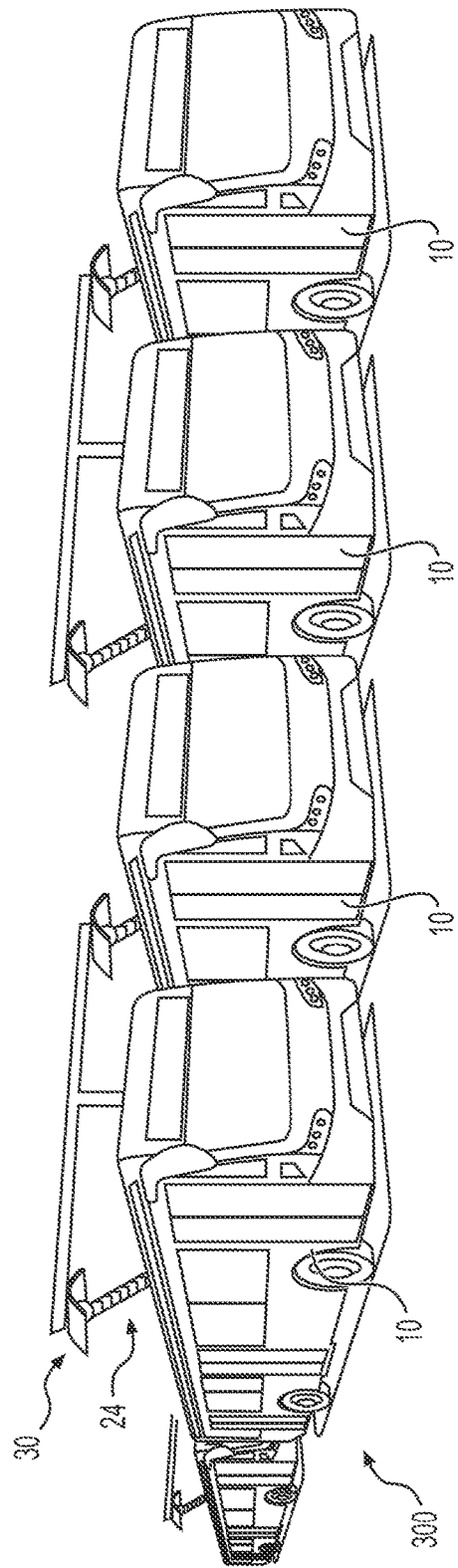
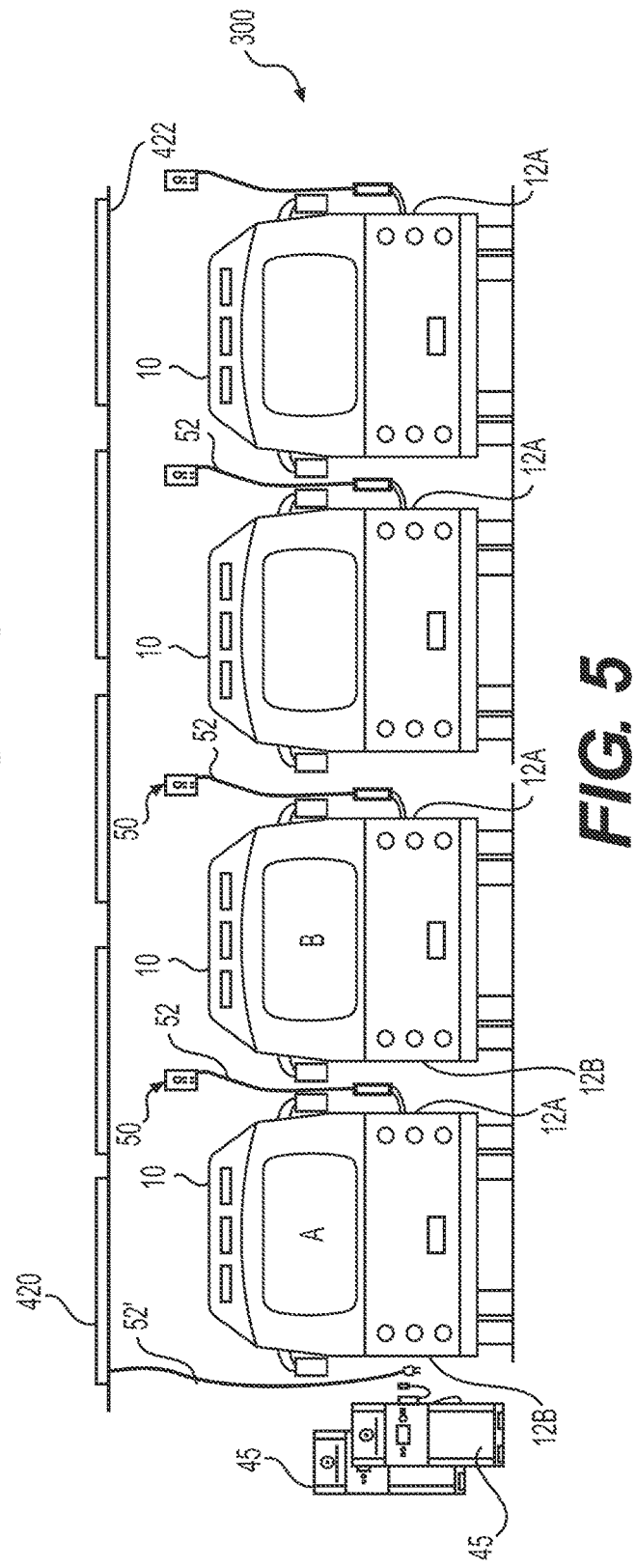

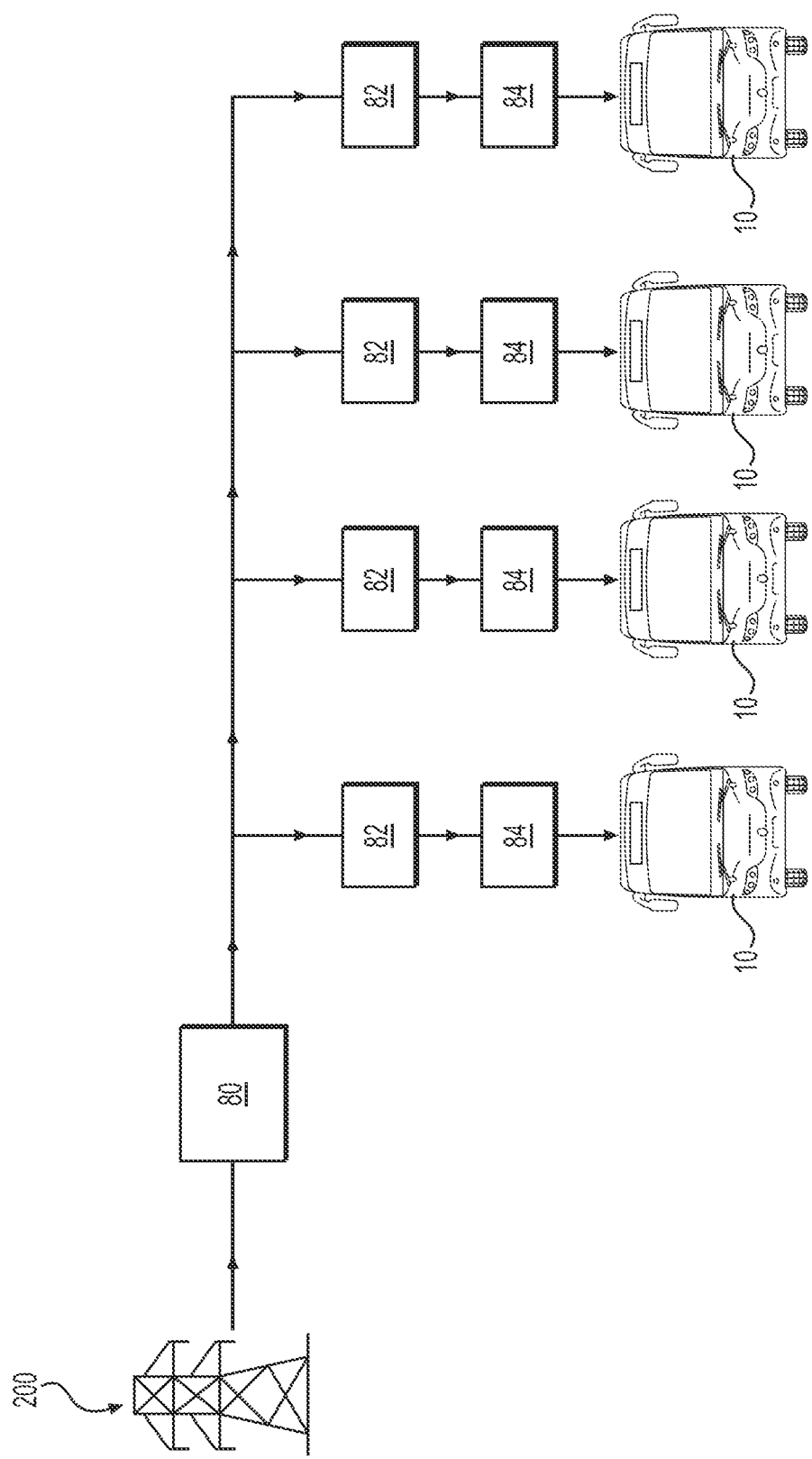

DEPOT CHARGING OF AN ELECTRIC VEHICLE FLEET

CROSS-REFERENCE TO RELATED APPLICATIONS

This application is the U.S. National Stage Application under 35 U.S.C. § 371 of International Application No. PCT/US2018/054649, filed on Oct. 5, 2018, now published as WO2019/071154, which claims the benefit of U.S. Provisional Application No. 62/569,311, filed Oct. 6, 2017, the disclosure of which is incorporated herein by reference in its entirety.

TECHNICAL FIELD

The current disclosure relates to systems and methods for charging a fleet of electric vehicles at a depot or similar facility.

BACKGROUND

Electric vehicles, such as buses, cars, trucks, etc. are charged using power from a utility grid to recharge their batteries. In some cases, electrical vehicles are recharged when they are parked at a location for an extended time (such as, for example, overnight). In the case of a fleet of electric vehicles, the vehicles may be recharged when they are parked overnight or during the day in a charging yard or a depot. In the case of a large fleet (such as, for example, a fleet of electric cars, trucks, buses, etc.), a reduction in operating costs can be achieved by reducing the infrastructural and other costs associated with charging (such as, for example, decreasing number of chargers, decreasing utility costs, increasing the number of vehicles that can be charged in the available area, etc.). Embodiments of the current disclosure may result in a decrease in charging related costs of an electric vehicle fleet. The scope of the current disclosure, however, is defined by the attached claims, and not by the ability to solve any specific problem.

SUMMARY

Embodiments of the present disclosure relate to systems and methods for using multiple charge protocols to charge an electric vehicle. Each of the embodiments disclosed herein may include one or more of the features described in connection with any of the other disclosed embodiments.

In one embodiment, a depot configured to charge a fleet of electric vehicle includes multiple charging electrodes adapted to direct electric power to the electric vehicle, and one or more charging systems that couple the multiple charging electrodes to an electric utility grid or other source of charging energy.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure. Where appropriate, reference numerals illustrating like structures and features in different figures are labeled similarly. It is understood that various combinations of these structures and/or features, other than those specifically shown, are contemplated and are within the scope of the present disclosure.

For simplicity and clarity of illustration, the figures only depict the general structure of the various embodiments. Details of well-known features (e.g., transformers, isolation circuitry, inverters, rectifiers, safety equipment, etc. that may be needed to safely and controllably direct AC or DC power to multiple electric vehicles from a common power bus, etc.) may be omitted for the sake of brevity (and to avoid obscuring other features), since these features/techniques are well known to a skilled artisan. Elements in the figures are not necessarily drawn to scale. The dimensions of some features may be exaggerated relative to other features to improve understanding of the exemplary embodiments. It should also be noted that, even if it is not specifically mentioned, aspects described with reference to one embodiment may also be applicable to, and may be used with, other embodiments.

FIGS. 4A-4C illustrate other exemplary depots adapted to charge a fleet of electric buses;

FIG. 5 illustrates another exemplary depot adapted to charge a fleet of electric buses.

FIG. 10 is a schematic illustration of an embodiment where alternating current (AC) is distributed in the depot.

DETAILED DESCRIPTION

The present disclosure describes systems and methods for charging of an electric vehicle fleet. While principles of the current disclosure are described with reference to the charging of a fleet of electric buses at a depot, it should be understood that the disclosure is not limited thereto. Rather, the systems and methods of the present disclosure may be used for the charging of any electric vehicle fleet (motorcycles, trucks, cars, etc.) at any location where they are parked. As used herein, the term "electric vehicle" includes any vehicle that is driven at least in part by electricity (e.g., all-electric vehicles, hybrid vehicles, etc.). Further, the term "depot" is used to describe a location where multiple electric vehicles are parked (e.g., garage, yard, parking lot, storage area, etc.). Also, relative terms such as "about," "substantially," "approximately," etc. are used to indicate a possible variation of ±10% in a stated numeric value. It should be noted that, even if it is not specifically mentioned, aspects described with reference to one embodiment may also be applicable to, and may be used with, other embodiments.

Figure 1A:
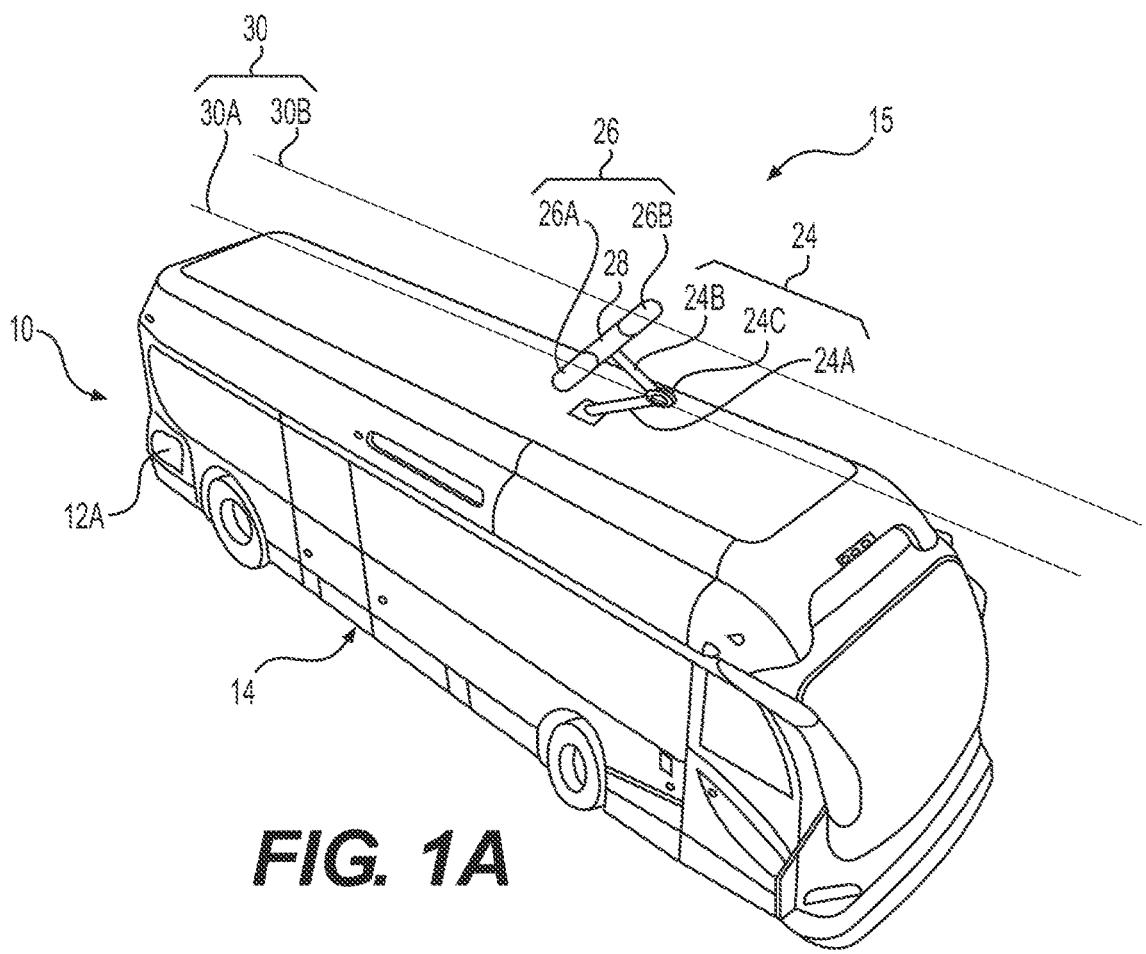
FIG. 1A illustrates a perspective view of an exemplary electric bus with a charging interface.
Figure 1B:
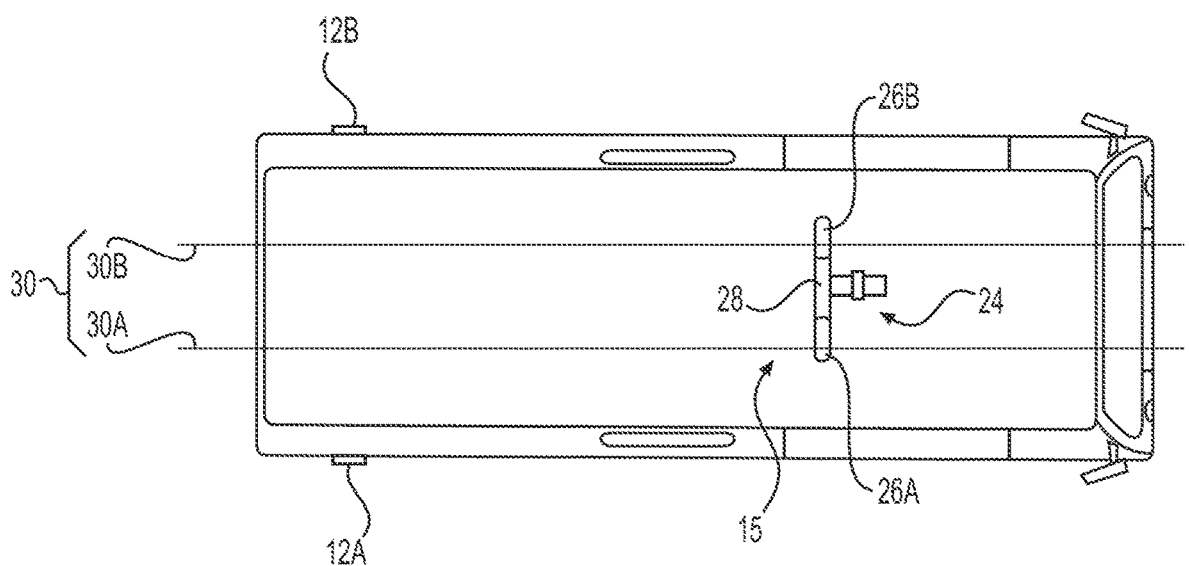
FIG. 1B illustrates a schematic top view of the bus of FIG. 1A.

FIGS. 1A and 1B illustrate different views of an electric vehicle in the form of a bus 10. FIG. 1A illustrates a perspective view and FIG. 1B illustrates a schematic top view. In the description below, reference will be made to both FIGS. 1A and 1B. Electric bus 10 may include a body enclosing a space for passengers, and include one or more electric motors (not shown) for propulsion. In some embodiments, bus 10 may be a low-floor bus. In other embodiments, bus 10 may be a standard (i.e., not a low-floor) bus. A battery system 14 may store electrical energy to power the traction motor and other electrical systems of bus 10. In some embodiments, the batteries that comprise battery system 14 may be positioned under the floor of bus 10. Additionally or alternatively, in some embodiments, these batteries may be positioned at other location (e.g., roof, under the seats, etc.). Battery system 14 may include batteries having any chemistry (lithium titanate oxide (LTO), nickel manganese cobalt (NMC), etc.) and construction. While in general, battery system 14 may be conductively charged (e.g., by electrically connecting the battery system to an external current source) or inductively charged (e.g., without physical contact), in the discussion below, only the case of conductive charging of bus 10 will be described. However, a skilled artisan would recognize that the concepts disclosed herein may also be applied to inductive charging of bus 10.

To charge or recharge the batteries, battery system 14 may be electrically connected to an external power source through one or more charge ports 12A, 12B or a charging interface 15 of bus 10. In some embodiments, bus 10 may include a single charge port 12A, for example, positioned on a side surface of bus 10. In some embodiments, different charge ports (e.g., charge ports 12A, 12B) may be positioned on either side of bus 10. Additionally or alternatively, in some embodiments, a charging interface 15 may be positioned, for example, on the roof of bus 10. It should be noted that these locations are only exemplary, and in general, charge ports 12A, 12B, and charging interface 15, may be positioned at any location (rear, front, etc.) of the bus 10. To charge bus 10 through charge port 12A (or charge port 12B), a charge cable (see charge cable 42 of FIG. 4A and 52, 52' of FIG. 5) is plugged into charge port 12A (or 12B) to input external electric power (e.g., from a utility grid, alternative energy source, etc.) to battery system 14. In some embodiments, charge ports 12A, 12B may be a standardized charge port (e.g., SAE J1772 charge port, ChadeMo charge port, etc.) or nonstandard charge port that is configured to receive a corresponding standardized connector (e.g., SAE J1772 connector). As would be recognized by people of ordinary skill in the art, SAE J1772 charge port and SAE J1772 connector are a standardized pair of electrical connectors for electric vehicles in the United States. To protect charge ports 12A, 12B from the environment (rain, snow, debris, etc.), a hinged lid may cover each charge port when not in use.

Charging interface 15 may include components that are configured to separably contact charge-receiving electrodes 26A, 26B (collectively referred as charge-receiving electrodes 26) of bus 10 to current-carrying charging electrodes 30A, 30B (collectively referred as charging electrodes 30) of an external charger to charge bus 10. As illustrated in FIGS. 1A and 1B, in some embodiments, these components may include a pantograph 24 or a catenary mounted on the roof of bus 10. As would be recognized by people skilled in the art, pantograph 24 includes charge-receiving electrodes 26 attached to one or more links (or other mechanisms) that are attached to the roof of bus 10. To charge bus 10, these links lift or raise from the roof to contact the charge-receiving electrodes 26 of bus 10 the external charging electrodes 30. In some embodiments, pantograph 24 may include a first link 24A with one end pivotably coupled to the roof at a pivot 22, and a second end pivotably coupled to a second link 24B at a pivot 24C. The opposite end of the second link 24B may include charge-receiving electrodes 26 that are configured to separably contact charging electrodes 30 and charge bus 10. In the embodiment illustrated in FIGS. 1A and 1B, charge-receiving electrodes 26 include a first electrode 26A and a second electrode 26B separated by an insulator 28 (or an air gap). And, the charging electrodes 30 include a first electrode 30A and a second electrode 30B in the form of wires, cables, or electrical conductors of another physical form that extend over the bus.

In some embodiments, first electrode 30A and second electrode 30B (in the form of elongate cables, wires, bars, rods, etc.) may extend over a row of buses 10 parked at the parking area of a bus depot. When a bus 10 approaches or is positioned below charging electrodes 30, pantograph 24 is activated to raise its charge-receiving electrodes 26 above the roof and contact charging electrodes 30. In some embodiments, when bus 10 is at a predetermined location in the depot (sensed, for example, based on RFID sensors, geofence locating system, etc.), pantograph 24 may be activated to raise charge-receiving electrodes 26 above the roof. In some embodiments, the driver (or another user) activates pantograph 24 when the bus is suitably positioned below charging electrodes 30. When electrical contact is established between the electrodes, current is directed into bus 10 to charge battery system 14. It should be noted that, although the depicted architecture does not show a ground connection or a mechanism for vehicle to vehicle isolation, as would be recognized by a person skilled in the art, charging interface 15 may include these features to charge buses in a safe and controlled fashion. After charging is complete, pantograph 24 lowers charge-receiving electrodes 26 back towards the roof. In the embodiment illustrated in FIGS. 1A and 1B, first electrode 26A and second electrode 26B (of the charge-receiving electrodes 26) are co-axially arranged and positioned transverse to the direction of travel of bus 10. And, first electrode 30A and second electrode 30B (of charging electrodes 30) are spaced apart from each other and extend in the direction of travel of bus 10. Such an orientation of the electrodes allows charge-receiving electrodes 26 of bus 10 to make contact with charging electrodes 30 even when there is some longitudinal and transverse misalignment between these electrodes. That is, when bus 10 is not positioned or aligned accurately with respect to charging electrodes 30. This ability to tolerate misalignment may relax the need for accurate positioning of bus 10 (with respect to charging electrodes 30) for charging, and allow for more flexibility for parking bus 10 at the depot.

Although not illustrated herein, in some embodiments, charge-receiving electrodes 26 may be arranged along the direction of travel of bus 10, and charging electrodes 30 may extend transverse to the direction of travel of bus 10. That is, first electrode 26A and second electrode 26B (of charge-receiving electrodes 26) may be arranged such that their longitudinal axes are co-axial and aligned along the length of bus 10, and first electrode 30A and second electrode 30B (of charging electrodes 30) may be spaced apart from each other and arranged transverse to the length of the bus 10. As a skilled artisan would recognize, such an orientation of the electrodes may also tolerate misalignment of bus 10 during charging.

It should be noted that charging interface 15 (illustrated in FIGS. 1A and 1B) described above, is only exemplary. In general, any suitable type of charging system may be used on bus 10 (see, for example, FIG. 3). It should also be noted that, although a pair of charging electrodes 30 and a pair of charge-receiving electrodes 26 are described above, this is only exemplary. In general, charging electrodes 30 and charge-receiving electrodes 26 may include any number (1, 3, 4, etc.) of electrodes. For example, a pair of electrodes may serve as positive and negative terminals, one or more additional electrodes may provide a ground or protective earth connection, and one or more additional electrodes may enable communication between bus 10 and the charging station. Further, although charging interface 15 is described as being a roof-mounted pantograph that raises or ascends from the roof to contact overhead charging electrodes 30, this is only exemplary. In some embodiments, charge-receiving electrodes 26 may be fixed (e.g., immovably fixed) to the bus roof, and charging electrodes 30 may descend (for example, from an overhanging charge head of the depot) and contact charge-receiving electrodes 26 to charge bus 10.

Figure 6:
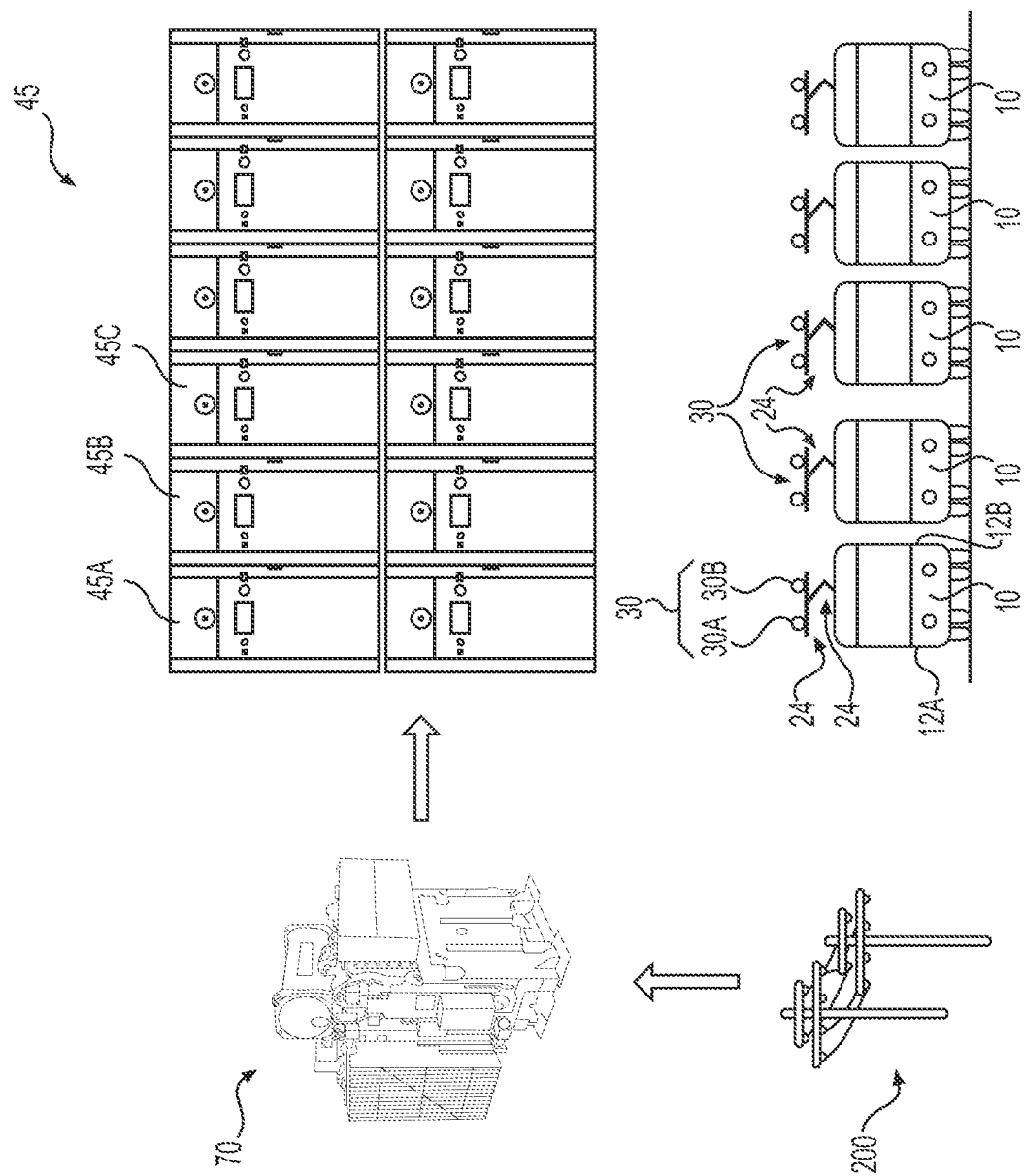
FIG. 6 illustrates another exemplary depot adapted to charge a fleet of electric buses.

For example, in an exemplary embodiment where charging electrodes 30 may be coupled to an inverted pantograph that descends and contacts charge-receiving electrodes fixed to the roof of a bus 10 for charging (see, for example, FIG. 6). With reference to FIG. 6, inverted pantograph 124 may be coupled to any overhead structure (e.g., roof, post, etc.) of the depot. As described previously, pantograph 124 may include any number of charging electrodes and the bus 10 may include any number of charge-receiving electrodes 26. And, these electrodes may be arranged in any orientation. In some embodiments, charge-receiving electrodes include four elongate charge-receiving electrodes that extend along the direction of travel of bus 10, and charging electrodes in bus 10 include four charging electrodes that extend substantially transverse to charge-receiving electrodes. Similar to pantograph 24 (described with reference to FIGS. 1A and 1B), pantograph 124 also includes links that rotate about pivot points to lower the charging electrodes towards the roof of bus 10, and raise the charging electrodes away from the roof, upon activation. When bus 10 approaches the charging station, or is positioned below charging electrodes, pantograph 124 may be activated to lower the charging electrodes (on inverted pantograph 124) and contact the charge-receiving electrodes on the roof of bus 10. U.S. Pat. No. 9,352,658; U.S. Patent Publication No. 2013/0193918; and U.S. patent application Ser. No. 14/980,697, commonly-assigned to the assignee of the current application, describe other exemplary embodiments of such charging interfaces and corresponding charging processes. These references are incorporated by reference in their entirety herein.

Figure 2A:
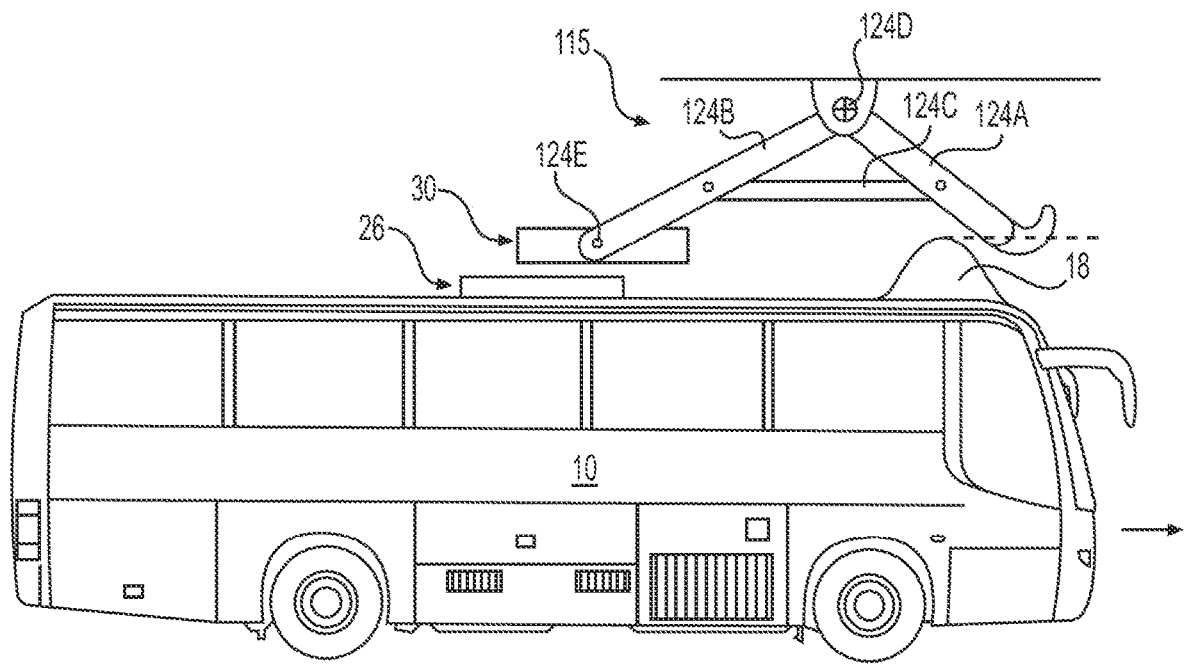
FIGS. 2A-2D illustrate another exemplary charging interface that may be used to charge an electric bus.
Figure 2B:
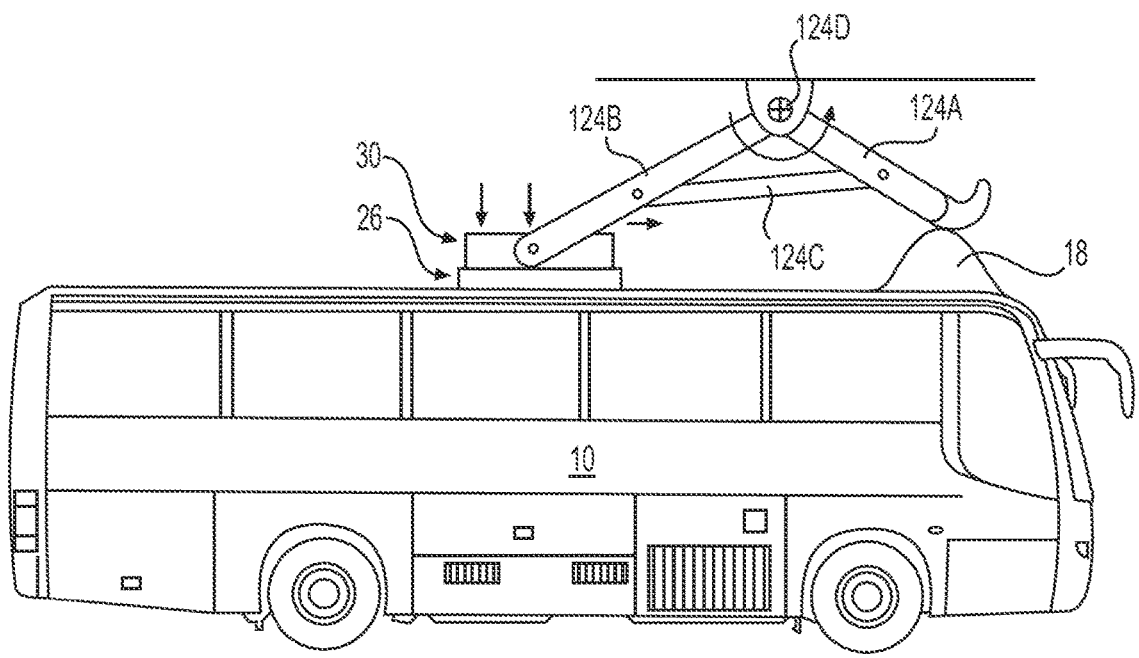

In some embodiments, upon activation of pantographs 24, 124, motors and/or actuators (e.g., pneumatic actuators, hydraulic actuators, etc.) (not shown) operate to rotate the links of pantographs 24, 124 about pivot points and decrease or increase the gap between charging electrodes 30 and charge-receiving electrodes 26. However, such automated movement is not a requirement. In some embodiments, as will be described with reference to FIGS. 2A-2D, a mechanism coupled to an overhead structure in the depot may engage with an interfacing structure (or an actuation member) on the approaching bus 10 to move charging electrodes 30 towards charge-receiving electrodes 26. With reference to FIGS. 2A and 2B, as bus 10 approaches or drives below the charging interface 115, an actuation member 18 mounted on bus 10 contacts or engages with (e.g., impacts, bumps into, etc.) with a mechanism or linkage of charging interface 115 and moves charging electrodes 30 towards charge-receiving electrodes 26 on bus 10. It should be noted that although FIGS. 2A and 2B only show a single charging electrode 30 and a single charge-receiving electrode 26, as discussed previously, any number of such electrodes may be provided.

Charging interface 115 includes a first link 124A coupled to a second link 124B at a pivot 124D. In some embodiments, charging interface 115 may also include a third link 124C that couples to the first and second links 124A, 124B. In some embodiments, first link 124A may be rigidly connected to second link 124B, and the rigidly joined first and second links 124A, 124B rotatably supported on an overhead structure (roof, post beam, etc.) of depot (or a roadside charging station) at a pivot 124D. That is, in such embodiments, the rigidly joined first and second links 124A, 124B rotate as a single part or an integral unit about pivot 124D. The bottom end of second link 124B is rotatably coupled to charging electrodes 30 at a pivot 124E such that charging electrodes 30 can rotate about pivot 124E.

As illustrated in FIG. 2A, prior to charging interface 115 engaging with bus 10 (i.e., in the free state of the charging interface 115), the bottom end of first link 124A is located or positioned below a top end of actuation member 18. When bus 10 moves forward under charging interface 115, the bottom end of first link 124A contacts and rides over actuation member 18, thus rotating the rigidly joined first and second links 124A, 124B counter-clockwise about pivot 124D. This rotation causes the bottom end of first link 124A to move away from the roof and the bottom end of second link 124B with charging electrodes 30 to move towards bus 10. As illustrated in FIG. 2B, the first and second links 124A, 124B are configured (sized, shaped, joined together, etc.) such that when the bottom end of first link 124A rides over actuation member 18, charging electrodes 30 are pressed or forced against charge-receiving electrodes 26. When charging electrodes 30 make contact with charge-receiving electrodes 26, the pivotably supported charging electrodes 30 rotate about pivot 124E so that charging electrodes 30 contact charge-receiving electrodes 26 over their entire area. When suitable contact is made, current flow is activated to charge bus 10. After charging, when bus 10 moves forward, first link 124A rides over actuation member 18 thereby separating charging electrodes 30 from charge-receiving electrodes 26. In some embodiments, the charging interface 115 may be biased (by springs, etc.) such that, when first link 124 breaks contact with actuation member 18, the rigidly joined first and second links 124A, 124B rotate in the clockwise direction back to its free state.

In some embodiments, charging interface 115 and/or actuation member 18 may include compliance (or may be otherwise configured) to reduce impact or shock loads that may occur when actuation member 18 first contacts first link 124A. In some embodiments, actuation member 18 may include one or more springs that impart compliance to the structure. For example, actuation member 18 may be attached to the roof of bus 10 via springs, the surface of actuation member 18 that contacts first link 124A may include springs, etc. In some embodiments, actuation member 18 may be made of a compliant material (e.g., rubber, polymeric material, etc.). Alternatively or additionally, in some embodiments, actuation member 18 and/or charging interface 115 may be shaped to minimize the impact forces. For example, the mating surfaces of both charging interface 115 and actuation member 18 may be rounded or otherwise configured to allow first link 124A to roll or slide on actuation member 18 when they make contact. In some embodiments, as illustrated in FIGS. 2A and 2B, the end of first link 124A that makes contact with actuation member 18 may be shaped (e.g., curved) to minimize the stress, make up for vehicle to vehicle variations, and impose a known force on the charging interfaces 115 during contact. The angle of the curved surface may be such that during impact with actuation member 18, the force vector has a greater lateral component. In some embodiments, the end of first link 124A that makes contact with actuation member 18 may include a roller.

Additionally or alternatively, in some embodiments, charging interface 115 may include one or more springs to allow the components of charging interface 115 to deflect upon impact to reduce the stress during impact with actuation member 18. In some embodiments, first link 124A may be compliant component (or include a spring) that deflects upon impact with actuation member 18. In some embodiments, instead of rigidly coupling first and second links 124A, 124B together, first link 124A may be loosely coupled to second link 124B such that both these links may rotate relative to each other about pivot 124D. In some such embodiments, third link 124C may be a spring-like member (e.g., a plunger-style spring loaded telescoping member) that maintains the angular spacing between first and second link 124A, 124B (e.g., in the configuration illustrated in FIG. 2A) and yet allow the first and second link 124A, 124B to rotate towards and away from each other about pivot 124D to reduce the force on these components when charging interface 115 engages with actuation member 18.

It should be noted that the configuration of charging interface 115 and actuation member 18 illustrated in FIGS. 2A and 2B is only exemplary. Typically, the shape and configuration of charging interface 115 and actuation member 18 may be selected to control the force between the charging and charge-receiving electrodes 30, 26 during contact, allow for dimensional variations between different buses, and allow for different approach speeds of buses. In general, charging interface 115 and actuation member 18 can have any shape and configuration suitable for the described functions. Actuation member 18 may be a fixed component on the roof or may be raised from the roof on demand or automatically. For example, in some embodiments, when the approaching bus 10 passes a predetermined point in the depot, actuation member 18 may be raised from the roof of bus 10 in preparation for charging. In some embodiments, actuation member 18 may be raised (automatically or by the driver) in response to the bus passing the predetermined point in the depot.

Figure 2C:
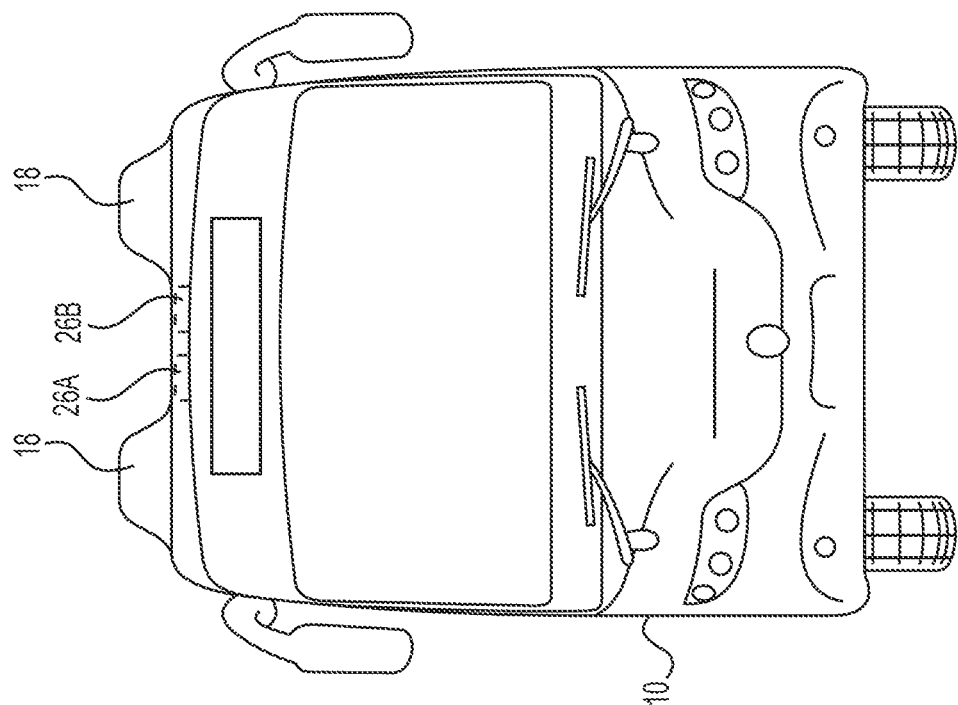
Figure 2D:
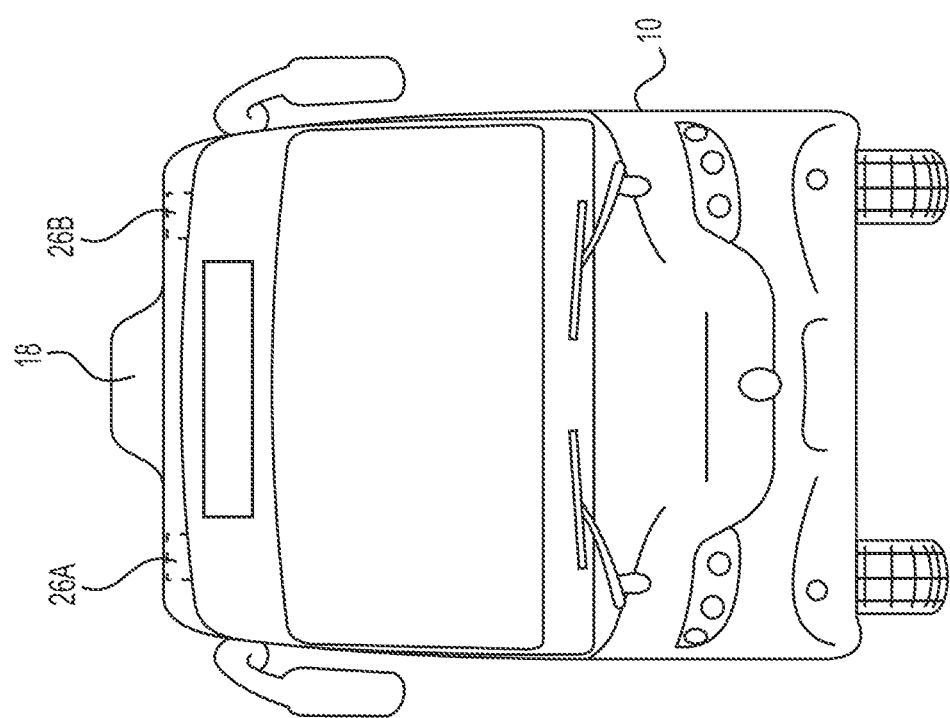

Although actuation member 18 is illustrated as being positioned on the roof of bus 10, this is only exemplary. In general, actuation member 18 may be positioned anywhere on bus 10. In some embodiments, as illustrated in FIGS. 2A and 2B, actuation member 18 may be positioned proximate the front of bus 10 and charge-receiving electrodes 26 positioned behind (with reference to the longitudinal axis of the bus 10) actuation member 18. With regard to the lateral positioning of actuation member 18 on the roof, in general, actuation member 18 may be positioned anywhere on the roof (center, sides, etc.). In some embodiments, as illustrated in FIG. 2C, actuation member 18 may be substantially centrally positioned along the width of bus 10 (i.e., along the longitudinal axis of bus 10) and charge-receiving electrodes 26A, 26B positioned on either side of actuation member 18. In some embodiments, as illustrated in FIG. 2D, two actuation members 18 may be positioned on either side of the roof, and charge-receiving electrodes 26A, 26B may be positioned between them. With reference to the longitudinal axis of bus 10, typically charge-receiving electrodes 26A, 26B may be positioned behind the actuation member 18 as illustrated in FIGS. 2A and 2B. However, this is not a requirement. It is also contemplated that in some embodiments, charge-receiving electrodes 26A, 26B and actuation member 18 may be positioned substantially at the same longitudinal location on the roof.

In some embodiments, the charge-receiving electrodes 26 on bus 10 are elongated components (e.g., rails, bars, etc.) that extend a substantial distance along the length of bus 10. An increased length of charge-receiving electrodes 26 allows charging electrodes 30 to contact charge-receiving electrodes 26 anywhere along its length. However, the mechanical actuation mechanism of charging interface 115 of FIGS. 2A and 2B allows for repeatable contact to be made with shorter charge-receiving electrodes 26. In some embodiments, bus 10 may be configured to stop automatically when contact is made between charging electrodes 30 and charge-receiving electrodes 26. Although in the description above, activation member 18 is positioned on the roof of bus 10 and the charging interface pivotably coupled to an overhead structure in the depot, this is only exemplary. It is also contemplated that, in some embodiments, the activation member 18 may affixed to an overhead structure in the depot, and the pivoted charging interface with charge-receiving electrodes 26 may be affixed to the roof of bus 10.

Overhead charging infrastructure (e.g., similar to the systems described with reference to FIGS. 1A, 2A, or other charging systems) may be provided at any location where a bus 10 may be charged. For example, in embodiments where a bus 10 will be charged at a bus stop where passengers are picked up or dropped off, a charging system may be provided such that each individual bus 10 may be charged when its passengers are loaded/unloaded. When operating a fleet of buses 10, many of these buses 10 may be parked at the depot for extended periods of time (overnight, between shifts, etc.). In some such embodiments, these buses 10 may be charged while they are parked at the depot.

FIG. 33 is a schematic illustration of an exemplary depot 300 where multiple buses 10 are simultaneously charged. Buses 10 may be parked nose to tail (or front to back) in different lanes (lane 1, lane 2, etc.) in depot 300. While parked, as described with reference to FIGS. 1A and 1B, charging interface 15 (e.g., pantograph 24) of each bus 10 may be raised to electrically connect charge-receiving electrodes 26 (i.e., electrodes 26A, 26B) of bus 10 with charging electrodes 30 (i.e., electrodes 30A, 30B) of depot 300 to charge bus 10. As illustrated in FIG. 33, in some embodiments, charging electrodes 30 may include an array (or a grid) of electrical conductors (overhead wires, bars, extended plates, or electrical conductors of another form) that extend over the bus-parking area of depot 300. In some embodiments, charging electrodes 30 may be arranged (e.g., spaced) such that all the buses 10 in each lane (lane 1, lane 2, etc.) may contact a single pair of charging electrodes 30A, 30B that extend along the entire lane. And, buses 10 parked in an adjacent lane may contact an adjacent pair of charging electrodes 30A, 30B. As illustrated in FIG. 33, a mix of buses 10 of different sizes (e.g., buses having lengths of 35', 40', 60', etc.) may be parked and charged in each lane.

Figure 3:
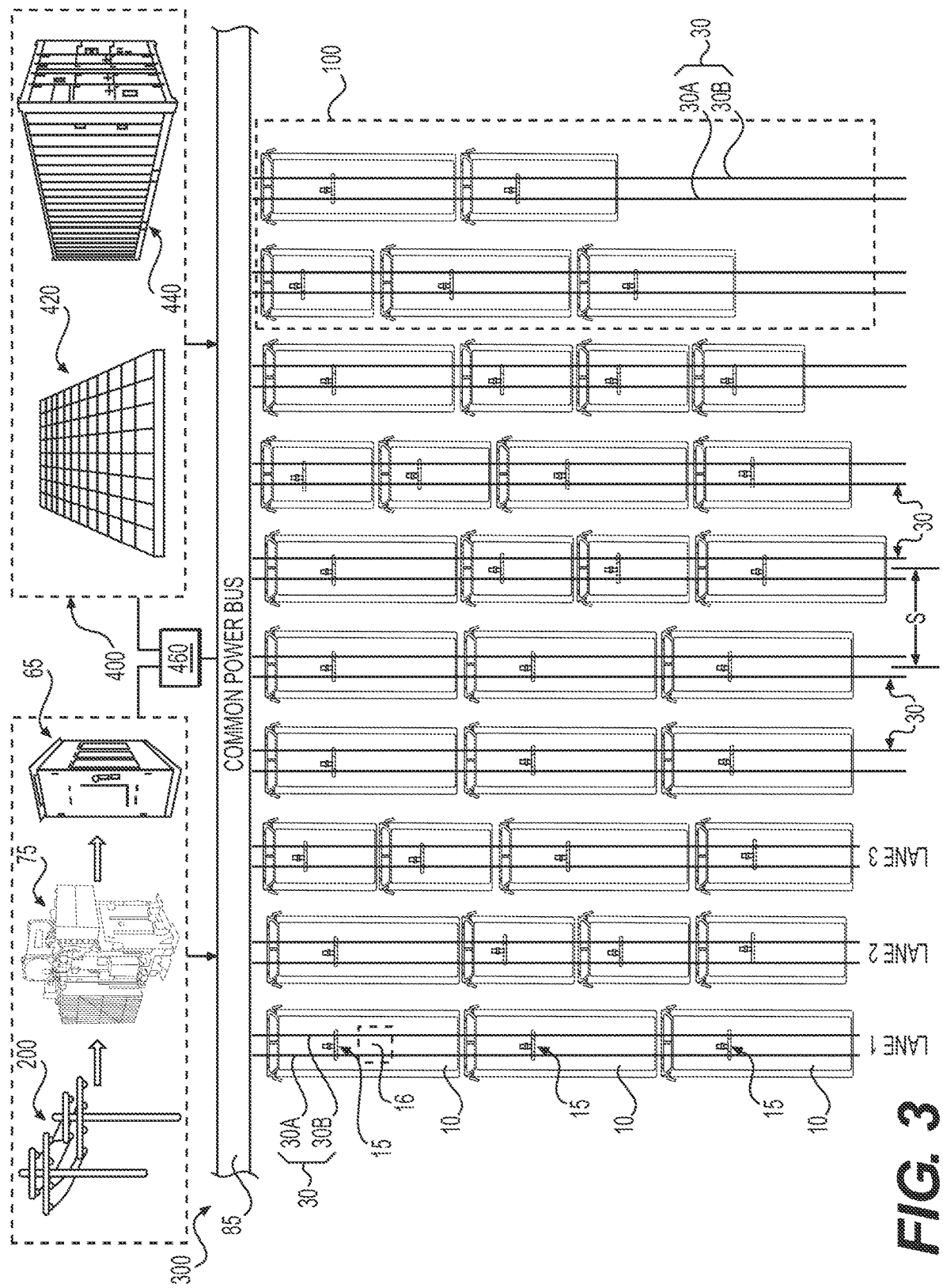
FIG. 3 illustrates an exemplary depot adapted to charge a fleet of electric buses.

It should also be noted that, although a pair of charging electrodes 30A, 30B are shown in FIG. 3, this is only exemplary. In general, any number of charging electrodes may extend over the bus-parking area of depot 300. For example, a pair of charging electrodes may serve as positive and negative terminals, one or more additional charging electrodes may provide a ground or protective earth connection to bus 10, and one or more additional electrodes may enable communication between each bus 10 and depot 300. It should also be noted that only a simplified architecture of the charging system is shown in FIG. 3. As would be recognized by a person skilled in the art, depot 300 and bus 10 may include components that enable the buses 10 to be charged using current from electrodes 30A, 30B in a safe and controlled manner. For example, in some embodiments, every bus 10 may need to be electrically isolated from each other, and every bus 10 may need individual voltage control. In some embodiments, the components in bus 10 may similar to those described with reference to FIG. 9 (with an additional inverter to convert DC power from depot 300 to AC power). Since suitable electrical architecture is well known to people skilled in the art, it is not described herein.

As would be recognized by people skilled in the art, for relatively large bus fleets (and/or in expensive real-estate markets), increasing the number of buses 10 that can be simultaneously parked and charged in depot 300 (or increased parking density of the buses) may improve the operational efficiency of the bus fleet. The parking density may be increased by decreasing the spacing (S) between each pair of charging electrodes 30. The numeric value of the spacing S may depend upon the application (for example, based on factors such as bus width, cost factors, etc.). In some embodiments, the spacing S may be between about 1-2 times the bus width, or preferably slightly over the bus width (e.g., about 1.01-1.1 times bus width) and less than about 1.5 times the bus width. Decreasing spacing S increases parking density. However, practical limitations (such as, for example, allowing enough space for the driver to exit the bus after parking, reducing the risk of collision, etc.) may necessitate at least a minimum gap between buses 10 in depot 300. In some embodiments, buses 10 and/or depot 300 may be enabled for autonomous or driver-less parking to decrease spacing S. Since vehicle-based and depot-based automated parking technology is known to people skilled in the art (for example, defined in the SAE J3016 standard), this is not described herein.

Although not a requirement, in some embodiments, as illustrated in FIG. 3, all the charging electrodes 30 of depot 300 may be powered by a common busbar 85 or power distribution circuit. Busbar 85 may carry high voltage current from the grid, and distribute this current to charging electrodes 30 to charge buses 10. In some embodiments, busbar 85 may provide DC current (of any voltage, such as, for example, 500V, 750V, 950V, etc.) to the charging electrodes 30. In such embodiments, electric power (i.e., AC current) from the grid 200 may be converted to DC current using a rectifier 65 (e.g., a bridge rectifier, etc.) and then directed to busbar 85. In some embodiments, a transformer 75 may also be provided in the power delivery circuit to increase or decrease the grid voltage prior to rectification. For example, in some embodiments, grid 200 may provide AC current having at a voltage between about 12-33 kV to transformer 75, and transformer 75 may step down this voltage to 750V, and rectifier 65 may convert the AC current to DC current. The DC current (at 750V) may then be provided to busbar 85 to be directed to buses 10 through charging electrodes 30. In some embodiments, dispensers (not shown) may be provided on busbar 85 to provide power to buses 10. In some embodiments, each bus 10 may include a converter 16 (e.g., DC to DC converter) (shown in only one bus 10 in FIG. 3) to convert the high voltage DC current from charging electrode 30 to a lower voltage that is suitable for charging battery system 14. In some embodiments, converter 16 may be a bi-directional converter. That is, converter 16 may step down the voltage (of the current from charging electrode 30) while charging battery system 14, and may step up the voltage when battery system 14 is discharging current to the charging electrode 30 (described in more detail later). It is also contemplated that, in some embodiments, converter 16 is located external to bus 10 (that is, the DC voltage is stepped down prior to being directed into the bus 10). However, in some embodiments, locating converter 16 onboard bus 10 may be advantageous. For example, locating converter 16 onboard bus 10 may save space in the yard thus allowing buses 10 to be parked more densely. Additionally, onboard DC-DC converter 16 may be cooled using the liquid cooling loop of bus 10. For example, a liquid coolant from the liquid cooling system of bus 10 may be circulated through or proximate converter 16 to cool the converter 16 on bus 10.

In some embodiments, depot 300 may also include a secondary power delivery system 400 to provide backup power to buses 10. Secondary power delivery system 400 may include any type of power generation device (e.g., solar panels 420, wind turbines, capacitors, generators (gas, diesel, etc.), etc.) or power storage device (e.g., external battery pack 440, flywheels, pumped hydroelectric energy storage, etc.) that can provide power to buses 10. Although not a requirement, in some embodiments, power from the secondary power delivery system 400 may also be directed to the buses 10 via busbar 85 and charging electrodes 30. In some embodiments, different cables direct power from secondary power delivery system 400 to buses 10. Although not illustrated in FIG. 3, secondary power delivery system 400 may also include support systems (e.g., transformers, rectifiers, safety systems, DC-DC converters, charging systems to charge battery pack 440, etc.) to convert the power from system 400 to a form suitable for buses 10, and control systems to control the delivery of power from system 400 to busbar 85. Power from the secondary delivery system 400 may be used to charge buses 10 at times of need (e.g., grid shutdown, voltage fluctuations, etc.) and/or to reduce cost.

A control system 460 may coordinate and manage the delivery of power from grid 200 and/or system 400 to busbar 85. Control system 460 may be housed in depot 300 or may be distributed between buses 10 and depot 300. That is, control system 460 may comprise multiple controllers or control units (some located in buses 10 and some located in depot 300) that collectively control and manage charging at the depot. In some embodiments, control system 460 may include one or more controllers and DC-DC converters on each bus 10 to control power on the common bus. In some embodiments, each bus 10 may include an isolated DC-DC charger controlled by control system 460 to control the charging of that bus 10. Control system 460 may selectively discharge power from one or more of utility grid 200, solar panels 420, and battery pack 440 (i.e., system 400) to buses 10. Control system 460 may also control the discharge of power from buses 10 to the utility grid 200 (referred to as vehicle-to-grid or V2G) and/or the battery pack 440 (e.g., to recharge battery pack 440). In some embodiments, control system 460 may also control the discharge of power from some buses 10 and direct the discharged power to other buses 10. Thus, in some embodiments, control system 460 (and other charging infrastructure in the depot 300) is not only configured to pull power from grid 200 to charge the buses 10, but also configured to feed power back into grid 200, if needed.

Typically, the utility company charges the fleet/depot operator for the energy consumed in charging buses 10 based on a prevailing tariff schedule. The tariff schedule documents the cost per unit of electricity (for example, $/kilo Watt hr.) as a function of several factors. These factors may vary with the geographic area, and include variables such as the season, time of use, rate of energy consumption (i.e., power), total energy consumed, voltage, etc. Typically, energy cost is higher when the demand for energy is higher (e.g., Summer months, and peak energy consumption times in the area) and lower when the demand is lower (e.g., Winter months, lean energy consumption times, etc.). In some cases, for commercial consumers, the energy cost may follow a tiered approach. That is, the energy cost may change with the total power consumed. For example, total power consumption (per billing cycle) between 20 kilo Watts (kW) and 1 Mega Watt (MW) may be charged at a first rate, between 1-50 MW may be charged at a second rate (typically higher than the first rate), and above 50 MW may be charged at a third rate (typically higher than the second rate).

The cost of electricity typically includes a "consumption charge" and a "demand charge." The consumption charge accounts for the actual cost for the generation of the consumed amount of electricity (e.g., fuel costs, etc.), and the demand charge accounts for fixed overhead costs. Although both consumption and demand charges are part of every electricity consumer's utility bill, residential customers usually pay one rate for electricity service, covering both consumption and demand. This combined charge is possible because there is relatively little variation in electricity use from home to home. However, for most commercial and industrial energy users, both consumption and demand vary greatly. Commercial customers (such as, fleet/depot operators) need large amounts of electricity once in a while. For example, the energy consumption of a depot 300 may be very high at certain times (e.g., when multiple buses 10 are charging at the same time) and lower at other times (e.g., when no buses or only few buses are charging). Meeting such a customer demand requires keeping a vast array of expensive equipment (transformers, substations, generating stations) on constant standby. These costs account for the demand charges of power.

Demand charges vary as a function of the rate at which energy is consumed (i.e., power consumption). That is, the cost for 100 kWhr of energy will be higher if this amount of energy were consumed in one unit of time (unit of time=1 minute, 15 minutes, 30 minutes, etc.) than if it were consumed over a longer time period (for example, in two units of time). For example, the cost per unit of energy is lower if the rate of energy consumption (typically measured as the total energy consumption for a reference time period, e.g., 15 minutes) is below a certain value, and higher if the rate of energy consumption is above this value. Typically utility companies monitor the total energy usage for a reference time period (e.g., 15-minute time window) to determine the demand billing rate (i.e., cost/kW) for utility cost calculations. In some geographic areas, the peak energy consumption in a 15-minute window in a billing cycle may be used to calculate the total energy cost for the entire billing cycle. For example, if during one 15-minute window during the billing cycle, the total energy consumption was 3 times the average for the rest of the billing cycle, the total energy cost for the entire billing cycle may be calculated at the higher rate (demand billing rate). The utility company may periodically revise the tariff schedule and communicate this revised schedule to the depot or fleet operator.

In some embodiments, control system 460 may control the delivery of power from grid 200 and system 400 to busbar 85 to minimize demand charges of power. For example, control system 460 may keep track of the total energy consumption at depot 300 (e.g., total energy consumed in the reference time window) and direct power from system 400 (i.e., solar panels 420 and/or battery pack 440) when the power consumption exceeds a value (e.g., a threshold value) that will result in increased demand charges. In one embodiment, control system 460 may determine the maximum permissible energy consumption ($E_{max}$) for the current reference time period (e.g., 15 minute time window, or any other reference time period used by the utility company to compute demand charges in that area) without triggering a demand rate hike (e.g., based on historic energy consumption data). Control system 460 may also determine the energy need ($E_{need}$) based on the number of buses 10 being charged (or awaiting charging) at the depot. If the energy that will be used in charging all the buses 10 will result in $E_{max}$ to be exceeded, control system 460 may control the delivery of power (i.e., selectively deliver power) from grid 200 and secondary power delivery system 400 such that $E_{max}$ is not exceeded, or the amount by which $E_{max}$ is exceeded (i.e., $E_{need}-E_{max}$) is minimized. For example, control system 460 may provide an amount of energy equal to $E_{max}$ from grid 200 and provide the remaining amount of energy (i.e., $E_{need}-E_{max}$) from system 400.

In some embodiments, buses 10 being charged at depot 300 may also act an energy source, and provide energy to charge other buses 10 (or for other uses, e.g., selling back to the grid 200, charging the external battery pack 440, powering other systems at depot 300, etc.). In general, buses 10 that have more energy (stored in their battery systems 14) than needed may direct the excess energy back to busbar 85. For example, based on the schedule of buses 10, control system 460 may determine the amount of energy needed by buses 10 for operation. If the energy stored in battery system 14 exceeds this amount, control system 460 may direct a portion of this excess energy back to grid 200, or use this energy to charge other buses 10 (e.g., when energy is scarce or energy cost is high). In some geographic areas, regulations governing the operation of large fleets require redundancy of buses 10. For example, if 100 transit buses operate along different routes in a city, the fleet operator may be required to maintain an extra, for example, 25 buses to avoid disruption of service. These reserve buses (illustrated as group 100 in FIG. 3), may be connected to charging electrodes 30, and may provide energy to busbar 85 when needed. Control system 460 may monitor the amount of energy available from different sources (grid 200, system 400, reserve buses in group 100, excess energy in buses, etc.) and selectively draw energy from these sources to charge the buses to reduce utility costs. In some embodiments, control system 460 may stagger the charging of buses 10 to reduce utility charges (for example, so that $E_{max}$ is not exceeded). That is, if charging all buses 10 at one time will cause $E_{max}$ for the current reference time period to be exceeded, the control system 460 may charge some of the buses 10 now and charge the remaining buses at another time (e.g., when the current reference time period ends).

It should be noted that FIG. 3 only illustrates an exemplary configuration of depot 300. As would be recognized by people skilled in the art, many other variations are possible and are within the scope of this disclosure. Some of these variations are discussed briefly below. In some embodiments, with reference to FIG. 3, charging electrodes 30 may extend over each row of buses 10 (as opposed to each lane of buses 10 as illustrated in FIG. 3). In some such embodiments, charge-receiving electrodes 26 of each bus 10 may extend along the length of the bus 10 (to tolerate misalignment). It should be noted that, although charging electrodes 30 are described as being elongate members that extend over multiple buses 10, this is not a requirement. In some embodiments, as illustrated in FIG. 4C, a pantograph 24 of each bus 10 may contact individual charging electrodes 30 positioned above each bus 10. These individual charging electrodes 30 may be supported on posts or another structure of depot 300 (e.g., suspended from the roof of the depot, etc.). As explained with reference to FIGS. 1A and 1B, the spacing between charging electrodes 30 (and/or the structures that support these charging electrodes) may be designed to be increase the parking density of buses 10 in depot 300.

Although not illustrated in FIG. 4C, charging electrodes 30 will be connected to a power delivery system that direct grid power (and/or power from another source) to these electrodes 30. In some embodiments, this power delivery system may similar to that described with reference to FIG. 3. For example, charging electrodes 30 may all be connected to a busbar 85 by bi-directional current conductors, and the busbar may be connected to the utility grid (such as, for example, through a rectifier and transformer), and a secondary power delivery system (that includes, for example, power generation devices (e.g., solar panels, etc.) and energy storage systems (e.g., battery packs, etc.)). And, a control system 460 associated with the depot may selectively direct power to charging electrodes 30 from the utility grid, the secondary power delivery system, and/or some of the buses based on energy need and cost.

With reference to FIG. 4C, in some embodiments, each charging electrode 30 (or a group of charging electrodes, such as, for example, every two adjacent charging electrodes) may be connected to an individual power control system, or charger unit (not shown in FIG. 4C), positioned proximate the buses (such as, for example, between the adjacent buses) or located remote from the buses (such as, for example, at an isolated area of the depot). In some such embodiments, buses 10 may include onboard isolation and DC-DC conversion circuitry. In some embodiments, each individual power control system or charger unit may include a console (see charger units 45 of FIG. 5) that houses electrical components (e.g., rectifier, power converter, switches, safety mechanisms, etc.) configured to convert power from the grid (e.g., single phase or three-phase AC current) to a form that may be supplied to bus 10 (e.g., DC current) through charging electrodes 30.

Although FIG. 3 illustrates a power distribution network where all buses 10 in depot 300 are powered by a single busbar 85, this is only exemplary. In some embodiments, the power distribution network of depot 300 may be broken into blocks (or chunks), each capable of providing a maximum amount of power (e.g., 500 kW, 1000 kW, etc.). For example, with reference to FIG. 3, in some embodiments, each lane (e.g., lane 1, lane 2, etc.) may comprise a separate power distribution block, multiple lanes together (lane 1 and lane 2, etc.) may comprise a separate power distribution block, etc. In some embodiments, each lane (or some lanes) may include multiple power distribution blocks. For example, with reference to FIG. 3, lane 2 may include two power distribution blocks each charging, for example, two buses. Each of these power distribution blocks may provide power to different pairs of charging electrodes 30. In some such embodiments, different busbars may provide power to the different power distribution blocks.

In some embodiments, instead of (or in addition to) an overhead charging interface 15, charge ports 12A, 12B (see FIGS. 1A, 1B) may be used to charge a bus 10 in depot 300. FIG. 5 illustrates an embodiment where multiple buses 10 parked in depot 300 are charged through their charge ports 12A. As illustrated in FIG. 5, depot 300 may include multiple charging outlets 50 that provide power to charge cables 52. Each charge cable 52 includes a connector (not shown) that may be plugged into charge port 12A to charge bus 10. Charging outlets 50 may be provided with power from the utility grid. In some embodiments, as described with reference to FIG. 3, a secondary power source (such as, for example, solar panels 420 and/or an external battery pack 440) may also provide power to charging outlets 50. Solar panels 420 may be positioned at any location in depot 300. In some embodiments, solar panels 420 may be positioned on a roof 422 of depot 300 (e.g., a canopy that covers the buses parked in depot).

The power to charging outlets 50 may be provided using a common power distribution network (and a common busbar) as described with reference to FIG. 3, or different groups of outlets 50 may be part of different power distribution networks of depot. For example, different charging outlets 50 (or groups of charging outlets 50) may be connected to different charger units 45. These charger units 45 may be positioned proximate to, or remote from, buses 10. In some embodiments, a single charger unit 45 may provide power to a single charging outlet 50. In some embodiments, multiple charging outlets 50 may be powered by a single charging unit 45. That is, the electrical equipment in the charger unit 45 may be sized to provide power to multiple buses 10. In some embodiments, a single charging outlet 50 may be positioned between adjacent buses 10, and two charge cables 52 may extend from the charging outlet 50. Each of these charge cables 52 may be connected to the charge port of one of the adjacent buses 10. For example, the left most charging outlet 50 of FIG. 5 (i.e., the charging outlet 50 positioned between the buses labelled A and B) may include two charge cables 52. And, one of these cables 52 may be connected to charge port 12A (i.e., called the curb-side charge port) of the bus labeled A and the other charge cable 52 may be connected to the charge port 12B (called the street-side charge port) of the bus labelled B. Although FIG. 5 illustrates the charging outlet 50 as being positioned on a vertical wall of depot 300, this is only exemplary. In some embodiments, charge cables 52 may drop down at appropriate locations (e.g., proximate the expected location of the charge ports) from the roof of depot 300. In some embodiments, charge cables 52' (only one shown in FIG. 5) may also be provided from the solar panels 420 to charge buses 10 using power from the solar panel 420. In some embodiments, as described with reference to FIG. 3, a control system may coordinate and manage the delivery of power from the grid and the solar panels 420 based on cost, need, etc.

In some embodiments, solar panels 420 may provide supplemental power to buses 10 along with power from the utility grid. In some embodiments, solar panels 420 may be the primary source of power for buses 10. In some jurisdictions, power produced by solar panels 420 cannot be redirected to utility grid (i.e., sold to the utility service provider) during certain sunlight hours when solar panels 420 are producing energy (because of excess power in the grid, etc.). Thus, unless used, the power produced by solar panels 420 may be wasted. In applications where buses 10 are parked at depot 300 during such sunlight hours, buses 10 may be charged primarily (or only) using power from solar panels 420. For example, charge cables 52' from solar panels 420 may be plugged into charge ports 12A and/or 12B of buses 10 to charge these buses. This is especially applicable for buses that are not in use (or have relatively large periods of non-use) during sunlight hours. For example, when buses 10 are used as school buses the buses may have downtime (periods of no use) during sunlight hours, between routes transporting students to school and routes returning students home. During this daytime downtime (i.e., downtime where there is sunlight), the school buses 10 may be charged by solar panels, such as solar panel 420 of depot 300 of FIG. 5.

In some embodiments, instead of charging outlets 50 being positioned between buses 10, charger units 45 themselves may be positioned between buses 10 (for example, on pedestals or a curb between the buses). To maximize parking density of buses 10, in some embodiments, the size of charger units 45 may be reduced. FIG. 4A illustrates an embodiment where charger units 45 are positioned between every two adjacent buses 10. The charger units 45 may be arranged such that, when buses are parked front to back (in lanes, as illustrated in FIG. 3), charger units 45 are positioned proximate the charge ports of adjacent buses 10 (for example, between the rear of the buses). A charge cable 42 that extends from each charger unit 45 may then be connected to a charge port (12A, 12B) of buses 10 for charging. In some embodiments, as illustrated in FIG. 4B, a charger unit 45 (for example, a single charger unit having a larger capacity) may be positioned between a pair of buses, and charge cables 42 from charger unit 45 connected to the charge ports of both the buses 10. That is, one charge cable may be plugged into the curb-side charge port 12A of the bus on the left of charger unit 45, and the other charge cable 42 may be plugged into the street-side charge port 12B of the bus on the right of charger unit 45. Providing charging infrastructure between every other column (or row) of buses 10 (as illustrated in FIG. 4B) reduces the amount of charging infrastructure needed, reduces the space occupied (or wasted) by the charging infrastructure, and increases the parking density of the buses 10 at depot 300. Although not shown herein, in some embodiments, a bus 10 may be charged using both charge ports 12A and 12B.

As explained above, charger units 45 may be positioned proximate the buses (as illustrated in FIGS. 4A and 5B) or may be positioned remote from the buses. FIG. 6 illustrates an embodiment where charger units 45 are positioned remote from buses 10. As illustrated in FIG. 6, in some embodiments, multiple individual charger units 45A, 45B, 45C, etc., clustered together are positioned remote from the area of depot 300 where buses 10 are parked. Each charger unit 45A, 45B, 45C, etc. may be configured to convert AC current from grid 200 to DC current to charge a single bus 10 (or a set number of buses 10). Each charger unit 45A, 45B, 45C, etc. may be sized to provide enough power to a bus 10 to fully charge a desired number of buses in a desired amount of time (e.g., 4 hrs., 6 hrs., 8 hrs., etc.). A transformer 70 may also be provided to convert the grid voltage to a lower voltage. In some embodiments, each charger unit 45 may provide current to multiple buses 10. Current from charger units 45 may be directed to buses 10 through charging conductors (not shown in FIG. 6) by any of the techniques described previously (i.e., overhead conductors that interface with charging interface 15 of the buses, inverted pantograph 124, charging interface 115, charge cables that plug into the charge ports 12A, 12B of the buses, etc.).

Figure 7:
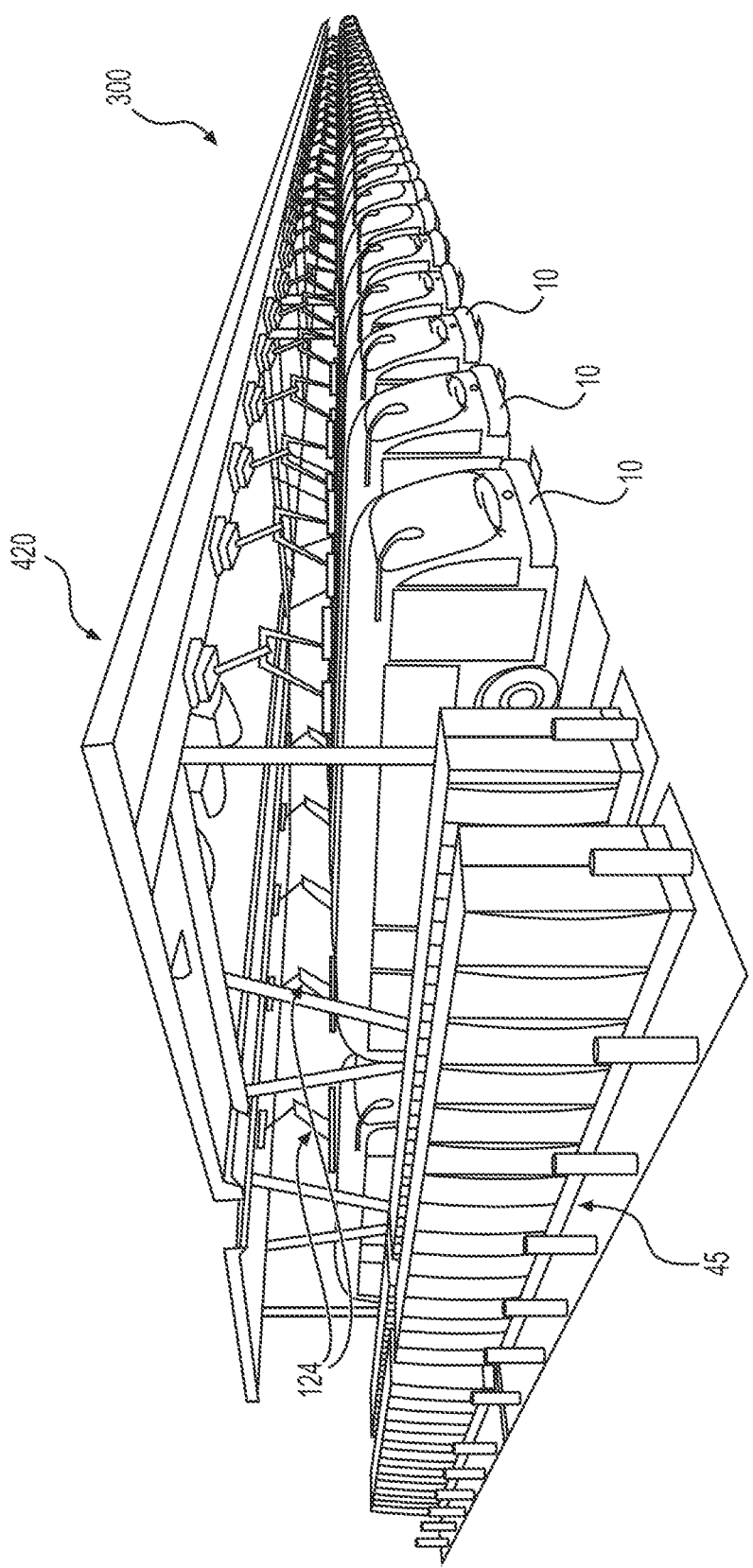
FIG. 7 illustrates another exemplary depot adapted to charge a fleet of electric buses.

FIG. 7 is an illustration of another exemplary depot 300 where multiple parked buses 10 are charged using inverted pantographs 124 that descend to contact charge-receiving electrodes 26 of each bus 10. As illustrated in FIG. 7, to increase the parking density of buses 10, charger units 45 that supply power to the inverted pantographs 124 may all be clustered together and positioned away from the buses 10. In some embodiments, as illustrated in FIG. 7, charger units 45 may be positioned to one side of the area where the buses 10 are parked. The roof of depot 300 may include solar panels 420. In some embodiments, a canopy that includes (or formed by) solar panels 420 may cover the parking area of buses 10 in depot 300. As discussed previously, these solar panels 420 may be used to provide power to charge buses 10 when needed. Although not illustrated in FIG. 7, in some embodiments, a backup external power source (such as, for example, battery pack 440 of FIG. 3) may also be provided to provide power to pantographs 124. It should be noted that although charging interfaces in the form of inverted pantographs are illustrated in FIG. 7, in general, as explained previously, any type of charging interface may be used to charge buses 10.

In some embodiments, instead of (or in addition to) invented pantographs 124, electrical cables (similar to charge cable 42 of FIGS. 4A, 4B) may direct power from charger units 45 to each bus 10. In such embodiments, connectors (e.g., SAE J1772 connectors) at the end of each cable may be plugged into charge port 12A and/or 12B of a bus 10 to charge bus 10. In some embodiments, these cables may be suspended from an overhead structure (e.g., the roof) of depot 300 proximate each bus 10. After a bus 10 is parked, the connector (of a dangling cable) may be plugged into charge port 12A (or 12B) of bus 10 to initiate charging. However, in some applications (for example, in a depot where multiple buses are charged at the same time), such dangling cables may not be desirable. Therefore, in some embodiments, the cables and their associated connectors may initially be maintained in a raised position. After a bus is parked, the cable may be lowered and connected to the charge port to initiate charging.

Figure 8A:
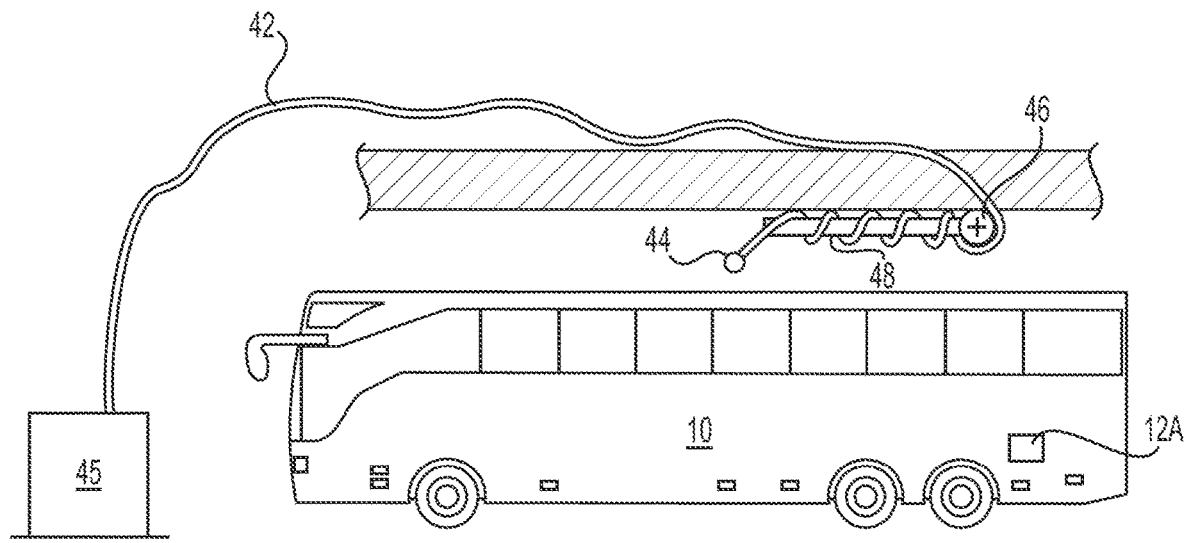
FIGS. 8A and 8B illustrate an exemplary cable retraction mechanism that may be used in a depot for charging an electric bus.
Figure 8B:
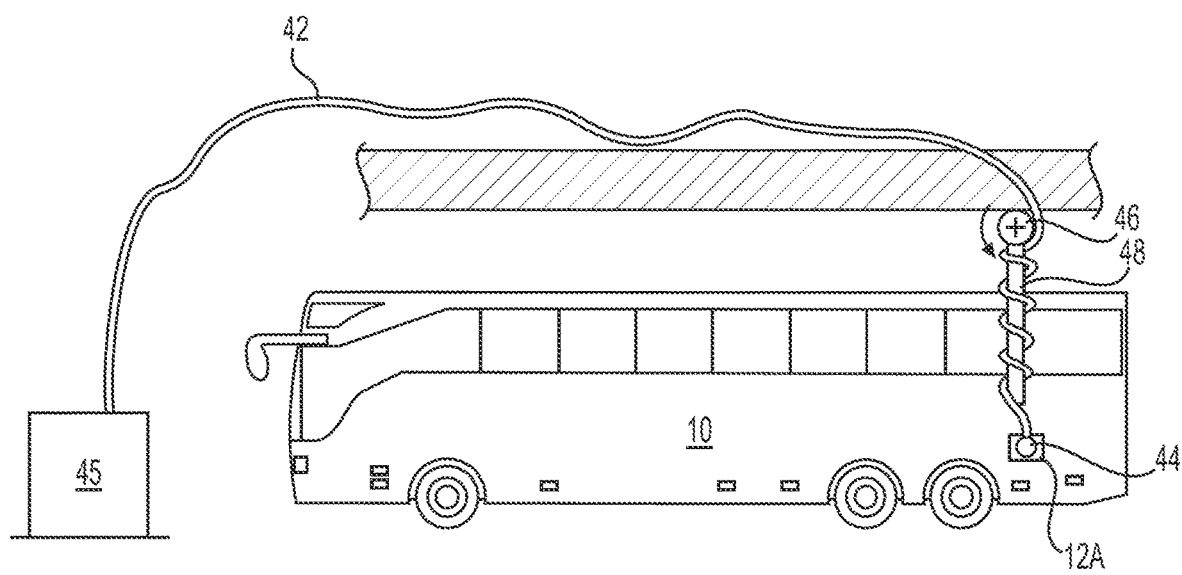

In some exemplary embodiments, the cables may be coupled to a mechanism that may be activated to raise and lower the cables. FIGS. 8A and 8B are schematic illustrations of an exemplary cable lowering mechanism that may be used in some embodiments. The cable lowering system of FIGS. 8A and 8B includes a hinged lever 48 coupled to an overhanging structure (e.g., roof) of the depot at a pivot 46. Rotation of the lever 48 about pivot 46 rotates lever 48 from a raised position (as shown in FIG. 8A) to a lowered position (as shown in FIG. 8B). In its powered position, the free end of lever 48 (i.e., the bottom end in FIG. 9B) is positioned proximate charge port 12A (or 12B) of a bus 10 that is parked in the depot for charging. A charge cable 42 with a connector 44 attached to its end is coupled (e.g., wound on) to lever 48 such that, when lever 48 is in its raised position, cable 42 and connector 44 are suspended above bus 10. When lever 48 is rotated to its lowered position, connector 44 is positioned proximate charge port 12A (or 12B) of bus 10. When in this position, connector 44 may be connected to charge port 12A (or 12B). The opposite end of cable 42 is connected to a charger unit 45. After charging bus 10, connector 44 is disconnected from bus 10, and lever 48 is rotated back to its raised position.

Lever 48 may activated (e.g., rotated between its raised and lowered positions) by any method. In some embodiments, a motor coupled to lever 48 may be activated to rotate lever 48 between its raised and lowered positions. In some embodiments, lever 48 may be lowered by, for example, pulling on a cord connected to lever 48. In some such embodiments, lever 48 may be spring loaded such that releasing the cord will return lever 48 (and cable 42 coupled thereto) to its default raised position. In some embodiments, the lever activation mechanism may be a mechanical system with counterweights, springs, etc. In some embodiments, multiple levers 48, each having a cable 42 and connector 44 attached thereto, may be provided in a depot. For example, each lever 48 may be poisoned proximate the parking spot of different parked bus in the depot (see FIG. 5). In some embodiments, some or all of these multiple levers 48 may be coupled together so that a single activation transitions all (or a subset of) levers 48 between its raised and lowered positions. Although FIGS. 8A and 8B illustrate a single cable 48 coupled to each lever 48, this is only exemplary. In some embodiments, multiple (e.g., two) cables 42 may be coupled to a lever 48, for example, positioned between two buses. And, connector 44 of one cable 42 may be coupled to charge port 12A of one bus 10 and connector 44 of the other cable 42 may be plugged into charge port 12B of an adjacent bus 10 (see, for example, FIG. 4B). In some embodiments, charge cables from solar panels 420 (e.g., cable 52' of FIG. 5) may also be similarly coupled to levers 48.

Although a cable lowering system in the form of rotatable levers 48 is illustrated in FIGS. 8A and 8B, this is only exemplary. In general, any mechanism that can raise and store cables 42 (and associated connectors 44) out of the path of buses (and people) may be used. For example, in some embodiments, cables 42 may be wound on rotatable spools attached to an overhanging structure (e.g., roof, etc.) of the depot. And, when needed, these spools may be rotated (by any method) to raise and lower the connector end of cables 42.

In the description above, charger units 45 are described as providing DC power to buses 10 in a depot for charging. That is, equipment (e.g., inverters, etc.) in a charger unit 45 converts AC power from the utility grid to DC power and directs this DC power to the different buses 10 charging in the depot. However, this is not a requirement. In some embodiments, AC power may be directed to the buses in the depot. In such embodiments, an AC-DC converter or a bi-directional AC-DC converter in each bus 10 may convert the AC power from the depot to DC power to charge its batteries. For example, in the embodiment of FIGS. 1A and 1B, when a bus 10 returns to the depot, it parks in a row and raises its roof-mounted pantograph 24 to connect its charge-receiving electrodes 26 to charging electrodes 30 and receive AC current.

Figure 9:
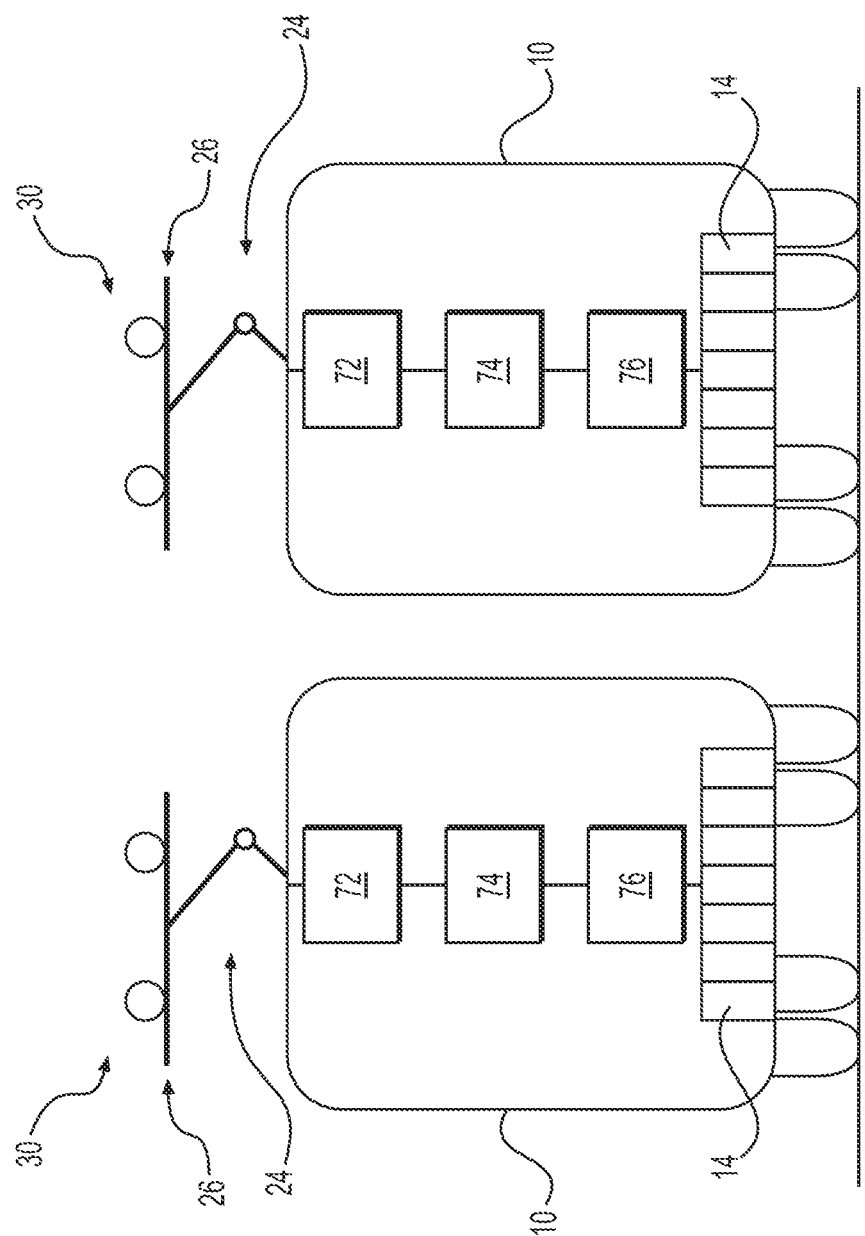
FIG. 9 is a schematic illustration of an embodiment where buses in a depot are charged using alternating current (AC)

FIG. 9 is a schematic illustration of buses 10 that receive AC power from the depot. As illustrated in FIG. 9, each bus 10 may include an AC contactor 72, an isolation transformer 74, and an converter 76 that receives AC power from the depot and converts it to a form suitable for charging battery system 14. In some embodiments, AC contactor 72 may be a switch (or a similar device) that is configured to disconnect a bus 10 from the AC power distribution network of the depot when charging is not in progress. Isolation transformer 74 converts (e.g., steps down) the voltage of the received AC current to a value that is suitable for charging battery system 14 of bus 10. Isolation transformer 74 also isolates a bus 10 from other buses 10 connected to the power distribution network. Converter 76 is configured to perform AC to DC conversion and charge battery system 14. It should be noted that, although an isolation transformer is described herein, this is only exemplary. In general, any device or method that enables a bus 10 to be electrically isolated from other buses 10 connected to the power distribution network may be used.

In some embodiments, isolation transformer 74 may be liquid cooled. Using a liquid cooled transformer 74 may enable the size of transformer 74 to be reduced and therefore may be especially suitable for a vehicle application. Bus 10 typically includes a liquid cooling loop that is used to cool heat producing components of bus 10. In some embodiments, the coolant from this liquid cooling loop may also be circulated to transformer 74 for cooling. Electric motor(s) that provide traction for bus 10 are typically AC motor(s), and an inverter in the bus 10 (referred to herein as a traction motor inverter) converts DC power from battery system 14 to AC power and directs it to the AC motor(s). In some embodiments, converter 76 may be the traction motor inverter of bus 10. That is, the traction motor inverter of bus 10 may also be used to convert AC power from the depot to DC power and charge battery system 14. In some embodiments, converter 76 may be a bi-directional inverter (i.e., performs AC to DC conversion and DC to AC conversion). As previously discussed, each bus 10 in depot may be configured to provide power to the depot (e.g., vehicle-grid or V2G) when needed. In such embodiments, converter 76 of bus 10 converts DC power from battery system 14 to AC power and direct it to the depot.

Providing AC power to bus 10, and converting AC to DC in bus 10, eliminates the need for providing bulky and expensive power electronics in the depot thus saving space. Further, the on-board isolation transformer 74 in each bus 10 electrically isolates the bus from other buses and upstream electrical circuitry. That is, although multiple buses 10 are electrically connected to the electrical network of the depot in parallel, the electrical circuits of each bus 10 are isolated from each other due to isolation transformers 74. Liquid cooling transformer 74 also reduces the physical size of transformer 74. Further, performing AC-DC conversion using existing components (e.g., traction motor inverter) in bus 10 results in cost and space savings.

In some embodiments, AC power may be distributed to different buses in the depot, but conversion to DC power may occur before the current is provided to bus 10. That is, a rectifier in the depot may convert AC to DC before the current is directed into bus 10. FIG. 10 is a schematic illustration of an exemplary power distribution network of depot in one embodiment. With reference to FIG. 10, AC current from a utility grid 200 is first directed to a voltage and frequency converter 80 where the voltage of the grid current is stepped down and its frequency is stepped up. In some embodiments, current from grid 200 may have a voltage of about 13.2 kV and a frequency of about 60 Hz (in the US). This current may be stepped down in voltage to about 0.5-2 kV and stepped up in frequency to about 15-30 kHz at converter 80. In some existing charging station applications, a transformer converts the grid current at 13.2 kV (and 60 Hz) to current at 480V (at 60 Hz). As would be recognized by people skilled in the art, a higher frequency of the current allows the use of smaller downstream transformers, and a higher voltage allows the use of smaller wires to distribute the current in the depot. However, a higher frequency may also cause electro-magnetic interference (EMI) related issues and a higher voltage may increase insulation requirements and regulatory burden. Therefore, in some embodiments, converter 80 converts the voltage and frequency of the input current to less than or equal to about 1 kV and about 22 kHz, respectively. As would be recognized by people skilled in the art, 22 KHz is higher than the frequency for human hearing and, in some jurisdictions, 1 kV is the cut-off voltage for increased regulatory requirements.

Current from the voltage and frequency converter 80 may be directed to a transformer 82 and rectifier 84 associated with each bus 10 in the depot. Transformer 82 may be an AC/AC isolation transformer that steps down the voltage and steps up the frequency of the input current. Transformer 82 may change the voltage and frequency to values as necessitated by the downstream equipment and bus. Transformer 82 may also include isolation capabilities to isolate downstream circuitry (and the bus) from the circuitry upstream. The AC current output from transformer 82 may be converted to DC in rectifier 84 and directed to bus 10. In some embodiments, rectifier 84 may be a buck rectifier (e.g., a rectifier which steps down the voltage). Since the frequency of the current input to transformer 82 is high (e.g., 22 kHz in some embodiments as opposed to 60 Hz grid frequency), the size of transformer 82 can be reduced. Further, in embodiments where a buck rectifier 84 is used (as opposed to a buck/boost rectifier), the size of the rectifier 84 may also be reduced. Reducing the physical size of the transformer 82 and rectifier 84 will reduce the space occupied by these components in the depot, and thus may assist in space saving. Although transformer 82 and rectifier 84 can be physically separate units, in some embodiments, both these components may be packaged in a single housing. In some embodiments, transformer 82 and rectifier 84 may form part of a charger unit 45. Similar to the embodiments discussed previously, the different charger units 45 may be positioned proximate to or remote from the buses (see FIGS. 4A, 4B, 5, 6, 7).

While the current disclosure describes several embodiments of depots adapted to charge a fleet of electric buses, it should be understood that the disclosure is not limited thereto. Rather, the principles described herein may be used to charge a fleet of any electrical vehicle. Those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description. For example, while certain features have been described in connection with some embodiments, it is to be understood that these features may also be used with other embodiments even if not expressly stated. That is, any feature described in conjunction with any embodiment disclosed herein may be used interchangeably with any other embodiment disclosed herein.

We claim:

1. A depot configured to charge a fleet of electric buses, comprising:
   a power distribution network, including:
   a plurality of rectifiers, each of the plurality of rectifiers configured to receive a respective AC current from the power distribution network, rectify the respective AC current into a respective DC current, and provide the respective DC current to a respective electric bus in the fleet of electric buses to charge the respective electric bus; and
   a plurality of transformers, wherein each of the plurality of transformers is upstream of a corresponding one of the plurality of rectifiers in the power distribution network;
   wherein the power distribution network is configured to receive an AC current and distribute the AC current to the plurality of rectifiers.

2. The depot of claim 1, wherein the plurality of transformers are AC/AC isolation transformers.

3. The depot of claim 1, wherein each of the plurality of transformers and the corresponding one of the plurality of rectifiers is positioned in a respective common housing.

4. The depot of claim 1, wherein:
   the power distribution network further includes a plurality of charger units; and
   each of the plurality of charger units includes a respective one of the plurality of transformers and the corresponding one of the plurality of rectifiers.

5. The depot of claim 4, wherein the plurality of charger units are distributed over the depot such that the depot is configured to receive the respective bus proximate to each of the plurality of charger units.

6. The depot of claim 4, further comprising:
   a plurality of locations, each of the plurality of locations corresponding to and remote from a respective one of the plurality of charger units, and each of the plurality of locations configured to receive the respective electric bus;
   wherein the power distribution network further includes a plurality of charge cables, each of the plurality of charge cables configured to connect the respective one of the plurality of charger units to the respective electric bus at a corresponding one of the plurality of locations.

7. The depot of claim 1, wherein the plurality of rectifiers is a plurality of buck rectifiers.

8. The depot of claim 1, wherein at least one of the plurality of transformers electrically isolates a respective bus of the fleet of electric buses from the others in the fleet of the electric buses.

9. A depot configured to charge a fleet of electric buses, comprising:
   a power distribution network, including:
   a plurality of rectifiers, each of the plurality of rectifiers configured to receive a respective AC current from the power distribution network, rectify the respective AC current into a respective DC current, and provide the respective DC current to a respective electric bus in the fleet of electric buses to charge the respective electric bus; and
   a voltage and frequency converter configured to receive an AC grid current from a power grid, step down a voltage of the AC grid current and step up a frequency of the grid current to form a converted AC current, and provide the converted AC current to the power distribution network;
   wherein the power distribution network is configured to receive an AC current and distribute the AC current to the plurality of rectifiers.

10. The depot of claim 9, wherein:
    the voltage and frequency converter is configured to step down the voltage of the AC grid current to less than or equal to about 1 kV; and
    the voltage and frequency converter is configured to step up the frequency of the AC grid current to about 22 kHz.

11. The depot of claim 9, further comprising a plurality of transformers, wherein each transformer is in communication with a respective rectifier of the plurality of rectifiers.

12. The depot of claim 11, wherein the plurality of transformers are AC/AC isolation transformers.

13. The depot of claim 11, wherein each of the plurality of transformers and the corresponding one of the plurality of rectifiers is positioned in a respective common housing.

14. The depot of claim 11, wherein the power distribution network further includes a plurality of charger units, wherein each of the plurality of charger units includes a respective one of the plurality of transformers and the corresponding one of the plurality of rectifiers.

15. The depot of claim 9, wherein the plurality of rectifiers is a plurality of buck rectifiers.

16. The depot of claim 9, wherein the voltage and frequency converter is configured to step down the voltage of the AC grid current from one or more current charging electrodes of the depot while charging at least one battery system of the fleet of electric buses.

17. The depot of claim 9, wherein the voltage and frequency converter is located external to the fleet of electric buses so that the voltage is stepped down prior to being directed into the respective electric bus.

18. The depot of claim 9, wherein the voltage and frequency converter is configured to step up the voltage when at least one battery system of the fleet of electric buses is discharging current one or more current charging electrodes of the depot.

19. The depot of claim 9, wherein the voltage and frequency converter is configured to step down the voltage of the AC grid current to between about 0.5-2 kV.

20. The depot of claim 9, wherein the voltage and frequency converter is configured to step up the frequency of the AC grid current to between about 15-30 kHz.

21. A depot configured to charge a fleet of electric buses, comprising:
- a plurality of parking locations, each of the plurality of parking locations configured to receive a respective electric bus of the fleet of electric buses;
- a plurality of charge cables, each of the plurality of charge cables having a plug end positioned proximate to a corresponding one of the plurality of parking locations and configured couple to a charge port of the respective electric bus to provide a respective DC current for charging the respective electric bus;
- a plurality of rectifiers, each of the plurality of rectifiers coupled to a corresponding one of the plurality of charge cables, and configured to receive a respective AC current, rectify the respective AC current to form the respective DC current, and provide the respective DC current to the corresponding one of the plurality of charge cables; and
- a power distribution connection configured to receive an AC grid current from a power grid and distribute the respective AC currents to the plurality of rectifiers.

22. The depot of claim 21, wherein the power distribution connection includes a voltage and frequency converter configured to receive the AC grid current from the power grid, step down a voltage of the AC grid current and step up a frequency of the grid current to form a converted AC current, such that the respective AC current distributed by the power distribution connection is the converted AC current.

23. The depot of claim 22, further comprising: a plurality of transformers, each of the plurality of transformers positioned between the power distribution connection and a corresponding one of the plurality of rectifiers.

24. The depot of claim 23, wherein each of the plurality of transformers and the corresponding one of the plurality of rectifiers are positioned in a respective common housing.

25. The depot of claim 23, further comprising: a plurality of charger units, each of the plurality of charger units including a respective one of the plurality of transformers and the corresponding one of the plurality of rectifiers.

26. The depot of claim 25, wherein each of the plurality of charger units is positioned proximate to a corresponding one of the plurality of parking locations.

27. The depot of claim 25, wherein the plurality of charger units are positioned remote from the plurality of parking locations.

28. The depot of claim 21, wherein the depot is configured to simultaneously charge a plurality of electric buses from the fleet of electric buses, each of the plurality of electric buses parked in a respective parking location and electrically connected to the corresponding one of the charger cables.

29. The depot of claim 21, wherein the plurality of rectifiers is a plurality of buck rectifiers.

30. A method of charging a fleet of electric buses, comprising:
- forming a converted AC current by receiving AC grid current at a voltage and frequency converter, stepping down a voltage of the AC grid current and stepping up a frequency of the grid current; and
- receiving the converted AC current at a power distribution network, the power distribution network:
- forming a respective modified AC current by stepping down the voltage and stepping up the frequency of the converted AC current at a plurality of transformers;
- rectifying the respective modified AC current into a respective DC current at plurality of rectifiers; and
- providing the respective DC current to a respective electric bus in the fleet of electric buses to charge the respective electric bus.

* * * * *